US012673269B2

(12) United States Patent
Qian et al.

(10) Patent No.: US 12,673,269 B2
(45) Date of Patent: Jul. 7, 2026

(54) INVITING OTHER PLAYERS TO ENGAGE IN VIRTUAL INTERACTIONS

(71) Applicant: Tencent Technology (Shenzhen) Company Limited, Shenzhen (CN)

(72) Inventors: Shanshan Qian, Shenzhen (CN); Lin Lin, Shenzhen (CN); Haohui Liang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 284 days.

(21) Appl. No.: 18/510,724

(22) Filed: Nov. 16, 2023

(65) Prior Publication Data

US 2024/0082738 A1 Mar. 14, 2024

Related U.S. Application Data

(63) Continuation of application No. PCT/CN2022/137133, filed on Dec. 7, 2022.

(30) Foreign Application Priority Data

Dec. 10, 2021 (CN) .......................... 202111511113.4

(51) Int. Cl.
*A63F 13/795* (2014.01)

(52) U.S. Cl.
CPC .................................. *A63F 13/795* (2014.09)

(58) Field of Classification Search
None
See application file for complete search history.

(56) References Cited

U.S. PATENT DOCUMENTS

| | | | | |
|---|---|---|---|---|
| 2019/0184292 A1* | 6/2019 | Higo | ......................... | A63F 13/42 |
| 2020/0368623 A1* | 11/2020 | Wu | ......................... | A63F 13/58 |
| 2024/0131434 A1* | 4/2024 | Wang | ..................... | A63F 13/533 |
| 2025/0032725 A1* | 1/2025 | Earwaker | .......... | A61M 5/31568 |
| 2025/0161814 A1* | 5/2025 | Liu | .......................... | A63F 13/56 |

FOREIGN PATENT DOCUMENTS

| | | |
|---|---|---|
| CN | 111450538 A | 7/2020 |
| CN | 112691377 A | 4/2021 |
| CN | 113521755 A | 10/2021 |
| CN | 113694524 A | 11/2021 |
| CN | 114247139 A | 3/2022 |

OTHER PUBLICATIONS

Office Action received for Chinese Patent Application No. 202111511113.4, mailed on Nov. 29, 2024 with English Translation, 28 pages.
International Search Report issued Feb. 20, 2023 in Application No. PCT/CN2022/137133, pp. 1-10.

* cited by examiner

*Primary Examiner* — Ronald Laneau

(74) *Attorney, Agent, or Firm* — ARENTFOX SCHIFF LLP

(57) ABSTRACT

A virtual interaction method including displaying a virtual scenario comprising a first virtual figure and a second virtual figure that participate in a battle game task, wherein the first virtual figure is controlled by a first device. The method further includes, in response to a trigger operation on the first device, displaying the first virtual figure and a target virtual figure performing an action directed to the second virtual figure together, wherein the target virtual figure is not controlled by the first device.

20 Claims, 13 Drawing Sheets

INVITING OTHER PLAYERS TO ENGAGE IN VIRTUAL INTERACTIONS

RELATED APPLICATIONS

This application is a continuation of International Application No. PCT/CN2022/137133, filed on Dec. 7, 2022, which claims priority to Chinese Patent Application No. 202111511113.4, filed on Dec. 10, 2021, and entitled "VIRTUAL RESOURCE INTERACTION METHOD AND APPARATUS, STORAGE MEDIUM, AND ELECTRONIC DEVICE.". The disclosures of the prior applications are hereby incorporated by reference in their entirety.

FIELD OF THE TECHNOLOGY

This application relates to the field of computers, including a virtual resource interaction method and apparatus, a storage medium, a program product, and an electronic device.

BACKGROUND OF THE DISCLOSURE

In a multiplayer interaction battle game application, a player needs to arrange a plurality of virtual characters in a virtual scenario by using a controlled virtual figure for a specific competition squad, and command the virtual characters in the squad to compete with a plurality of virtual characters in an opponent squad, to complete a battle game task. Meanwhile, virtual figures respectively controlled by two players may interact with each other by using virtual social resources owned by the virtual figures, and an interaction special effect is displayed, to enrich picture content displayed during a battle.

However, in virtual social resource interaction manners provided in the related art currently, a virtual figure controlled by a player A generally selects a target virtual social resource owned by the virtual figure, and transmits the target virtual social resource to a virtual figure controlled by a player B participating in a battle game task. That is, in the virtual social resource interaction methods provided in the related art, an interaction form is relatively single.

SUMMARY

Embodiments of this disclosure provide a virtual resource interaction method and apparatus, a storage medium, a program product, and an electronic device, to at least resolve a technical problem that an interaction form is relatively single in related virtual social resource interaction methods.

In an embodiment, a virtual resource interaction method includes displaying a virtual scenario comprising a first virtual figure and a second virtual figure that participate in a battle game task, wherein the first virtual figure is controlled by a first device. The method further includes, in response to a trigger operation on the first device, displaying the first virtual figure and a target virtual figure performing an action directed to the second virtual figure together, wherein the target virtual figure is not controlled by the first device.

In an embodiment, a virtual resource interaction apparatus includes processing circuitry configured to display a virtual scenario comprising a first virtual figure and a second virtual figure that participate in a battle game task, wherein the first virtual figure is controlled by a first device. The processing circuitry is further configured to, in response to a trigger operation on the first device, display the first virtual figure and a target virtual figure performing an action directed to the second virtual figure together, wherein the target virtual figure is not controlled by the first device.

In an embodiment, a non-transitory computer-readable storage medium stores computer-readable instructions thereon, which, when executed by processing circuitry, cause the processing circuitry to perform a virtual resource interaction method that includes displaying a virtual scenario comprising a first virtual figure and a second virtual figure that participate in a battle game task, wherein the first virtual figure is controlled by a first device. The method further includes, in response to a trigger operation on the first device, displaying the first virtual figure and a target virtual figure performing an action directed to the second virtual figure together, wherein the target virtual figure is not controlled by the first device.

BRIEF DESCRIPTION OF THE DRAWINGS

The accompanying drawings described herein are used for providing a further understanding of this disclosure, and form a part of this disclosure. Exemplary embodiments of this disclosure and the description of the embodiments are used for explaining this disclosure and do not constitute any limitation to this disclosure. In the accompanying drawings.

DESCRIPTION OF EMBODIMENTS

Figure 1:
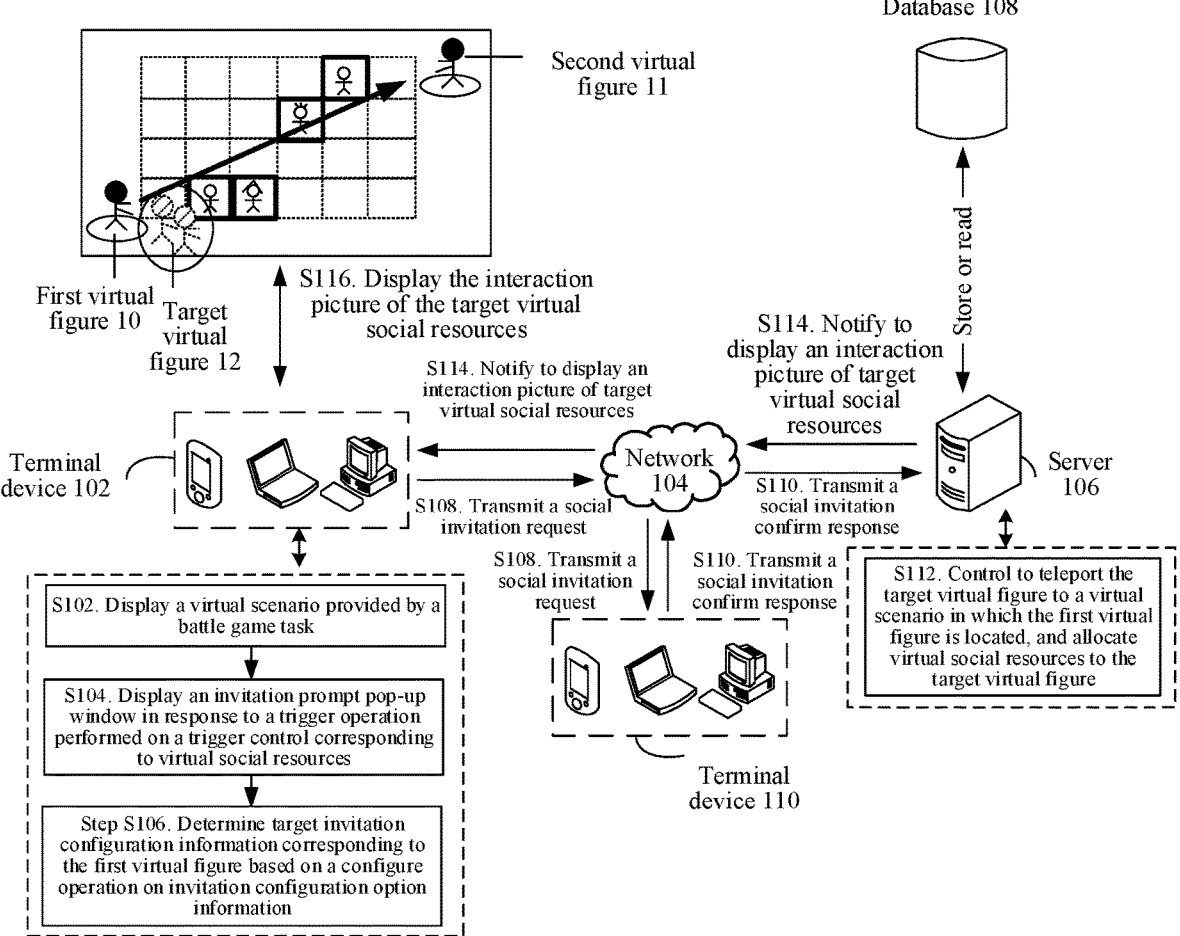
FIG. 1 is a schematic diagram of a hardware environment of a virtual resource interaction method according to an embodiment of this disclosure.

To make solutions in this disclosure more comprehensible for a person skilled in the art, the technical solutions in the embodiments of this disclosure are clearly and completely described below with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

In the specification, claims, and accompanying drawings of this disclosure, the terms "first", "second", and the like are intended to distinguish between similar objects but do not necessarily indicate a specific order or sequence. It is to be understood that data termed in such a way is interchangeable in proper circumstances, so that the embodiments of this disclosure described herein can be implemented in other orders than the order illustrated or described herein. Moreover, the terms "include", "have" and any other variants mean to cover non-exclusive inclusion, for example, a process, method, system, product, or device that includes a series of steps or units is not necessarily limited to those expressly listed steps or units, but may include other steps or units not expressly listed or inherent to such a process, method, system, product, or device.

The embodiments of this disclosure relate to the following technical terms:

Auto chess: A new multiplayer battle strategy game. A player can autonomously match and develop a chess piece squad to fight against an opponent squad, where a hit point (hit point, HP) of a loser is deducted, and ranks are determined based on an elimination order.

Chessboard: Each player in an auto chess game has a home chessboard and can match a squad in the home chessboard, and the player is randomly teleported to a home of an opponent (sometimes the opponent is teleported to the home chessboard of the player) through a portal during a battle for battling.

Portal: Each player heads to a chessboard of another player through a portal for battling, and returns a home chessboard of the player after the battle ends.

According to an aspect of the embodiments of this disclosure, a virtual resource interaction method is provided. In an implementation, the virtual resource interaction method may be applicable to, but not limited to, a virtual resource interaction system in a hardware environment shown in FIG. 1. The virtual resource interaction system includes a terminal device 102, a network 104, a server 106, a database 108, and a terminal device 110. A client of a battle game application runs in both the terminal device 102 and the terminal device 110. The terminal device 102 includes a human-machine interaction screen, a processor (processing circuitry), and a memory (non-transitory computer-readable storage medium). The human-machine interaction screen displays a virtual scenario provided by a battle game task, and the virtual scenario includes a first virtual figure and a second virtual figure that participate in the battle game task and belong to different camps. The first virtual figure and the second virtual figure may directly compete with each other in the virtual scenario, or may control virtual characters owned by the virtual figures respectively to compete with each other. The human-machine interaction screen is further configured to provide a human-machine interaction interface, to receive a human-machine interaction operation for controlling a controlled virtual figure in the virtual scenario, and the virtual figure may complete the battle game task set in the virtual scenario. The processor is configured to generate an interaction instruction in response to the human-machine interaction operation, and transmit the interaction instruction to the server. The memory is configured to store related attribute data, for example, picture data of a scenario picture, attribute information of a virtual figure (for example, level information of the virtual figure, a hit point of the virtual figure, and a quantity of a type of virtual characters owned by the virtual figure) controlled by a client, or virtual social resources (i.e., resources of virtual social interactions) owned by a virtual figure controlled by a client. In addition, the terminal device 102 is configured to obtain target invitation configuration information and trigger a social invitation request for a target virtual figure, to invite the target virtual figure to participate in the current battle game task.

The terminal device 110 also includes a human-machine interaction screen, a processor, and a memory. A battle game application same as that in the terminal device 102 is run in the terminal device, and a user account for logging in to a game application in the terminal device 110 has an association relationship with a user account for logging in to a game application in the terminal device 102. The terminal device 110 is configured to display a social invitation prompt pop-up window corresponding to the social invitation request and further teleport, in response to a confirm and receive operation, a virtual figure (that is, a target virtual FIG. 12) controlled by the user account for logging in to a game application in the terminal device 110 to a virtual scenario in which the first virtual figure controlled by the terminal device 102 is located, so that the target virtual figure and the first virtual figure together complete a process of transmitting virtual social resources (i.e., virtual resource interactions) to the second virtual figure.

In addition, the server 106 includes a processing engine, and the processing engine is configured to perform a storage or read operation on the database 108. Specifically, the processing engine determines, based on a social invitation confirm response fed back by the terminal device 110, that the virtual figure (that is, the target virtual figure) controlled by the user account for logging in to a game application in the terminal device 110 accepts the social invitation request of the first virtual figure. The processing engine then teleports the target virtual figure to the virtual scenario in which the first virtual figure is located, and read corresponding virtual social resources allocated to the target virtual figure from the database 108, where the virtual social resources come from the first virtual figure.

A specific process includes the following steps. Step S102: Display a virtual scenario provided by a battle game task in a display interface of the terminal device 102 (for example, as shown in FIG. 1, the virtual scenario includes a first virtual FIG. 10 and a second virtual FIG. 11 that belong to different camps). Step S104: Display an invitation prompt pop-up window in response to a trigger operation performed on a trigger control corresponding to virtual social resources, where the invitation prompt pop-up window displays to-be-configured invitation configuration option information. Step S106: Determine target invitation configuration information corresponding to the first virtual figure based on a configure operation on the invitation configuration option information. Step S108: Transmit a social invitation request to at least one virtual figure indicated in the target invitation configuration information through the network 104 (for example, as shown in FIG. 1, the virtual figure in the terminal device 110 is a virtual figure indicated by the target invitation configuration information).

Step S110 is performed in a case that the terminal device 110 displays a social invitation prompt pop-up window and obtains a conform operation performed on a confirm control in the social invitation prompt pop-up window, to transmit a social invitation confirm response to the server 106 through the network 104.

The server 106 performs step S112 and step S114, to control and teleport a target virtual figure that accepts the social invitation request to the virtual scenario in which the first virtual figure is located, and read virtual social resources that are pre-allocated to the target virtual figure by the first virtual figure from the database 108. The server then notifies the terminal device 102 to display an interaction picture of target virtual social resources. In this way, the terminal device 102 may perform step S116, to display the interaction picture of the target virtual social resources.

In another implementation, when the terminal device 102 has a strong computing processing capability, step S112 may alternatively be completed by the terminal device 102. The description herein is merely an example, and this embodiment is not limited thereto.

In this embodiment, in a displayed virtual scenario provided by a battle game task, an invitation prompt pop-up window including to-be-configured invitation configuration option information is displayed in response to a trigger operation performed on a trigger control corresponding to virtual social resources. In a case that target invitation configuration information corresponding to the first virtual figure is determined based on the invitation configuration option information, a social invitation request is transmitted to at least one virtual figure indicated in the target invitation configuration information. In a case that a target virtual figure accepts the social invitation request, an interaction picture of target virtual social resources is displayed in the virtual scenario, where the target virtual social resources are virtual social resources transmitted by the first virtual figure and the target virtual figure to the second virtual figure. That is, in the battle game task in which the first virtual figure participates, the target virtual figure may be invited to transmit the target virtual social resources with the first virtual figure together to the opponent second virtual figure, so that a resource interaction process between the first virtual figure and the second virtual figure may be more enriched and diversified rather than being limited to a fixed one-to-one interaction form, thereby overcoming a problem that a virtual social resource interaction form is relatively single in the related art. Further, an embodiment of this disclosure may provide a new interaction manner for a terminal device controlling a plurality of virtual figures to transmit interaction information (for example, the interaction picture of the target virtual social resources) to a same terminal device, thereby improving the convenience of a user in interacting with a plurality of terminal devices and improving the operation convenience.

In this embodiment, the terminal device may be a terminal device provided with a target client and may include, but not limited to, at least one of the following: a mobile phone (for example, an Android mobile phone, or an iOS mobile phone), a notebook computer, a tablet computer, a palmtop computer, a mobile Internet device (MID), a PAD, a desktop computer, a smart TV, and the like. The target client may be a client that supports running of a battle game application such as a video client, an instant messaging client, a browser client, an education client, and the like. The foregoing network may include, but not limited to, a wired network and a wireless network. The wired network includes: a local area network, a metropolitan area network, and a wide area network. The wireless network includes: Bluetooth, Wi-Fi, and other networks that achieve wireless communication. The foregoing server may be a single server, a server cluster that includes a plurality of servers, or a cloud server. The foregoing description is merely an example, and this embodiment is not limited thereto.

Figure 2:
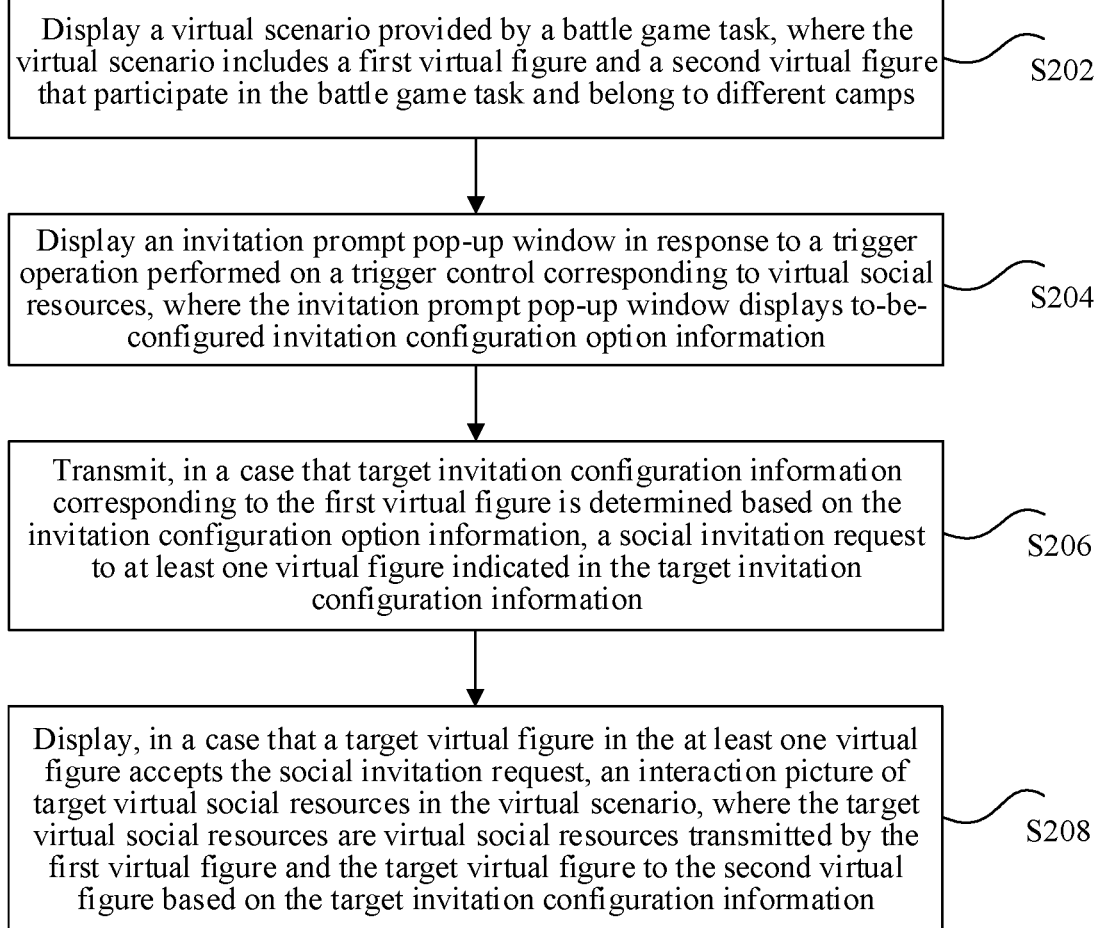
FIG. 2 is a flowchart of a virtual resource interaction method according to an embodiment of this disclosure.

In an embodiment, as shown in FIG. 2, the virtual resource interaction method includes the following steps:

S202: Display a virtual scenario provided by a battle game task, where the virtual scenario includes a first virtual figure and a second virtual figure that participate in the battle game task and belong to different camps. For example, a virtual scenario is displayed comprising a first virtual figure and a second virtual figure that participate in a battle game task. The first virtual figure is controlled by a first device.

In this embodiment, a game application in which the battle game task is located may be, but not limited to, a multiplayer online battle arena (MOBA) game application, such as a battle game application of an auto chess type. The game application may include, but not limited to, at least one of the following: a two-dimensional (2D) game application, a three-dimensional (3D) game application, a virtual reality (VR) game application, an augmented reality (AR) game application, and a mixed reality (MR) game application. The foregoing is merely an example, and this embodiment is not limited thereto.

Figure 10:
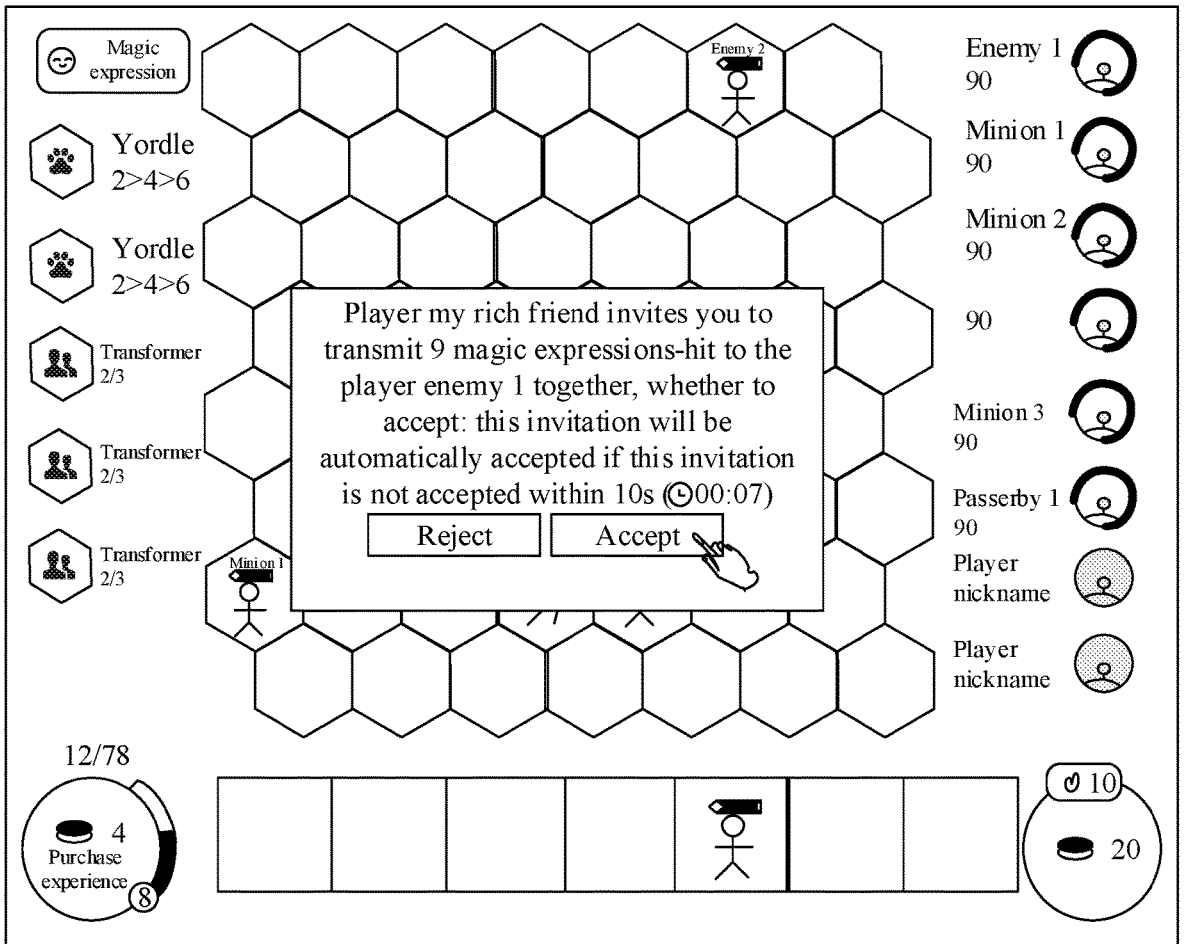
FIG. 10 is a schematic diagram of a virtual resource interaction method according to an embodiment of this disclosure.
Figure 11:
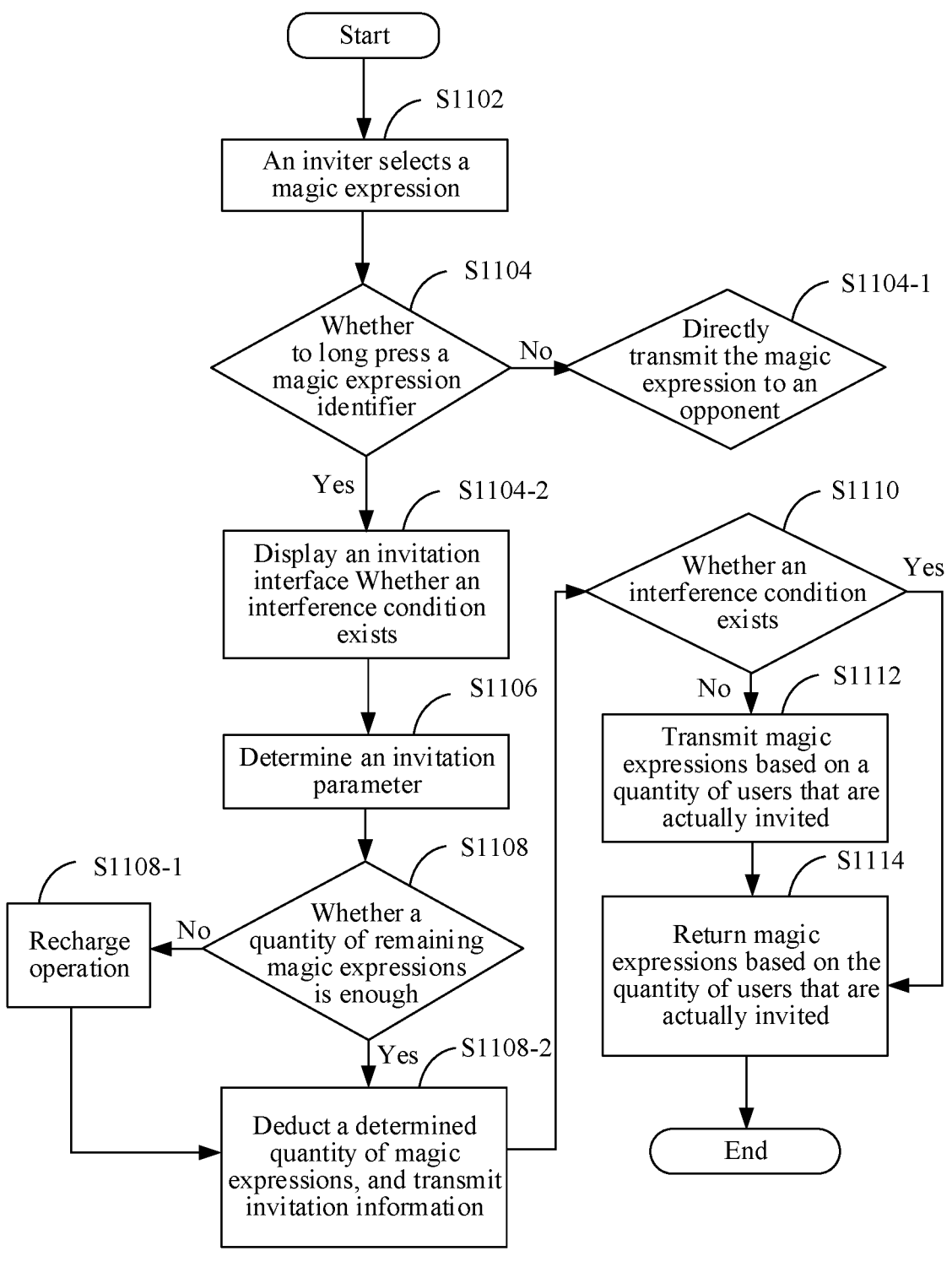
FIG. 11 is a flowchart of a virtual resource interaction method according to an embodiment of this disclosure.

In this embodiment, the first virtual figure and the second virtual figure in the foregoing virtual scenario may include, but not limited to, virtual figures controlled by players through clients of the game application. The first virtual figure and the second virtual figure may directly compete with each other in the virtual scenario, or may arrange virtual characters based on a specified squad in the virtual scenario, to complete competition between the virtual figures through competition between the virtual characters. FIG. 1 shows a virtual scenario provided by an auto chess battle game task. A first virtual FIG. 10 and a second virtual FIG. 11 are respectively located on a diagonal of a picture, points and lines in the picture form a chessboard, and an object shown by a bold line frame in the chessboard is a virtual character (also referred to as a little hero) controlled by each virtual figure, which is an avatar of a player in the auto chess battle game task, and the player may select one or more virtual characters to join in a competition process during battling.

S204: Display an invitation prompt pop-up window in response to a trigger operation performed on a trigger control corresponding to virtual social resources, where the invitation prompt pop-up window displays to-be-configured invitation configuration option information. For example, an invitation prompt pop-up window is displayed in response to a trigger operation performed on a trigger control corresponding to a virtual social interaction. The invitation prompt pop-up window displays to-be-configured invitation configuration information.

In this embodiment, the virtual social resources may be, but not limited to, social consumables in the battle game task, and the social consumables are used to complete a social requirement between the virtual figures and present the social requirement in the picture in a form of a special effect. Still using the auto chess battle game task as an example, the virtual social resources herein may be, but not limited to, virtual expressions, and the virtual expressions are used to express various emotions of each virtual figure, such as joy, celebration, disappointment, or sarcasm, and display a visible virtual expression special effect.

In this embodiment, the invitation prompt pop-up window may include, but not limited to, the following invitation configuration option information: an option identifier corresponding to each to-be-invited candidate virtual figure and quantity option information corresponding to virtual social resources to be transmitted by each virtual figure accepting an invitation. The candidate virtual figure may be, but not limited to, a virtual figure controlled by a teammate that has not been eliminated in a round of game task. The quantity option information may include, but not limited to: a quantity value inputted through an input control, a quantity value selected by a slide operation on a slider control, and a quantity value selected by plus and minus buttons. The option content and option forms herein are merely an example, and this embodiment is not limited thereto.

S206: Transmit, in a case that target invitation configuration information corresponding to the first virtual figure is determined based on the invitation configuration option information, a social invitation request to at least one virtual figure indicated in the target invitation configuration information. For example, when the invitation configuration information is configured, a social invitation request is transmitted to at least one virtual figure indicated in the invitation configuration information.

The target invitation configuration information herein is obtained from selected target option information in the invitation configuration option information. That is, the at least one virtual figure herein may be one or more virtual figures in the candidate virtual figures.

S208: Display, in a case that a target virtual figure in the at least one virtual figure accepts the social invitation request, an interaction picture of target virtual social resources in the virtual scenario, where the target virtual social resources are virtual social resources transmitted by the first virtual figure and the target virtual figure to the second virtual figure based on the target invitation configuration information. The target virtual figure herein refers to a virtual figure that accepts the social invitation request in the at least one virtual figure. For example, in response to a determination that a target virtual figure in the at least one virtual figure has accepted the social invitation request, an interaction picture is displayed of the virtual social interaction transmitted by the first virtual figure and the target virtual figure to the second virtual figure based on the invitation configuration information. In another example, in response to a trigger operation on the first device, the first virtual figure and a target virtual figure are displayed performing an action directed to the second virtual figure together, where the target virtual figure is not controlled by the first device.

The target virtual figure is to be invited to the virtual scenario in which the first virtual figure is located, to assist the first virtual figure in completing a virtual social resource interaction process. A necessary compensation measure may be provided for the battle game task in which the target virtual figure is to participate. For example, the compensation measure may include, but not limited to: compensation for game duration of the target virtual figure, or the target virtual figure is teleported only after a battle game task in which the target virtual figure currently participates is completed.

In this embodiment, the virtual social resources need to be obtained through switching by using a switching resource value. The virtual social resources to be transmitted by the target virtual figure herein are also provided by the first virtual figure. Therefore, when virtual social resources held by the first virtual figure is not enough to meet the at least one virtual figure invited in the target invitation configuration information and a resource quantity configured for the at least one virtual figure, the first virtual figure is prompted to supplement the switching resource value in time. In addition, in this embodiment, if a quantity of target virtual figures that accepts the invitation is less than a quantity of virtual figures to which the invitation is transmitted, or if a quantity of target virtual figures entering the virtual scenario in which the first virtual figure is located is less than a quantity of target virtual figures that accepts the invitation, allocated virtual social resources are returned to the first virtual figure.

In this embodiment, the target virtual social resources may be obtained from the virtual social resources held by the first virtual figure, but are not limited thereto. That is, the first virtual figure provides the to-be-transmitted virtual social resources to the invited target virtual figure. In this way, the first virtual figure and the target virtual figure transmit the target virtual social resources to the second virtual figure together, thereby enriching a social resource interaction form between the first virtual figure and the second virtual figure, so that more players are attracted and participate in the battle game task, and utilization and a download rate of the game application are improved.

In addition, in this embodiment, in a case that any one of the first virtual figure or the second virtual figure meets an interference condition, an interaction process of the target virtual social resources is stopped. The interference condition may include, but not limited to, that a defense resource value (for example, a hit point or an energy value) of the first virtual figure or the second virtual figure reaches zero, which indicates that the first virtual figure or the second virtual figure stops the currently run battle game task, and also needs to stop a virtual social resource interaction process executed by the first virtual figure or the second virtual figure.

According to this embodiment of this disclosure, in a displayed virtual scenario provided by a battle game task, an invitation prompt pop-up window including to-be-configured invitation configuration option information is displayed in response to a trigger operation performed on a trigger control corresponding to virtual social resources. In a case that target invitation configuration information corresponding to the first virtual figure is determined based on the invitation configuration option information, a social invitation request is transmitted to at least one virtual figure indicated in the target invitation configuration information. In a case that a target virtual figure accepts the social invitation request, an interaction picture of target virtual social resources is displayed in the virtual scenario, where the target virtual social resources are virtual social resources transmitted by the first virtual figure and the target virtual figure to the second virtual figure. That is, in the battle game task in which the first virtual figure participates, the target virtual figure may be invited to transmit the target virtual social resources with the first virtual figure together to the opponent second virtual figure, so that a resource interaction process between the first virtual figure and the second virtual figure may be more enriched and diversified rather than being limited to a fixed one-to-one interaction form, thereby overcoming a problem that a virtual social resource interaction form is relatively single in the related art. Further, an embodiment of this disclosure may provide a new interaction manner for a terminal device controlling a plurality of virtual figures to transmit interaction information (for example, the interaction picture of the target virtual social resources) to a same terminal device, thereby improving the convenience of a user in interacting with a plurality of terminal devices and improving the operation convenience.

In a solution, that an invitation prompt pop-up window is displayed in response to a trigger operation performed on a trigger control corresponding to virtual social resources includes:

S1: Display an operation pop-up window corresponding to the virtual social resources in response to a press operation performed on the trigger control corresponding to the virtual social resources, where the operation pop-up window includes an invitation control.

S2: Display the invitation prompt pop-up window in response to a press operation performed on the invitation control, where the invitation configuration option information in the invitation prompt pop-up window includes: an option identifier corresponding to each to-be-invited candidate virtual figure and quantity option information corresponding to virtual social resources to be transmitted by each virtual figure accepting an invitation.

It is to be understood that, the press operation includes, but not limited to, operation forms such as a tap operation, a double-tap operation, or a long press operation, and a specific form of the press operation is not limited herein.

In an embodiment, different subsequent operation manners may be configured in response to different types of press operations performed on the trigger control. In an exemplary manner, in response to a tap (single tap) operation performed on the trigger control corresponding to the virtual social resources, it may be controlled to directly display an interaction picture of the virtual social resources; and in response to a long press operation performed on the trigger control corresponding to the virtual social resources, it may be controlled to display an operation pop-up window corresponding to the virtual social resources, where the operation pop-up window includes an invitation control. Further, the operation pop-up window may further include control components such as a quantity selection slider and a transmission confirm control.

Figure 3:
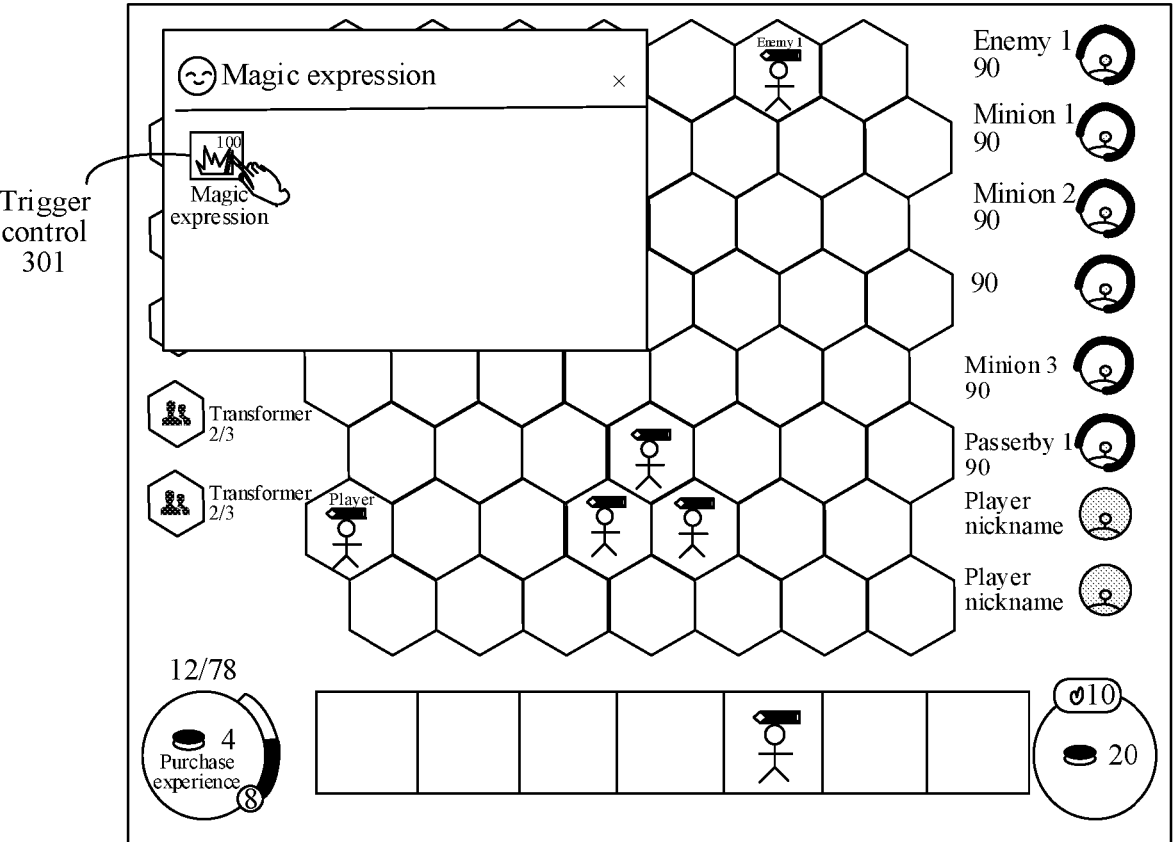
FIG. 3 is a schematic diagram of a virtual resource interaction method according to an embodiment of this disclosure.
Figure 4:
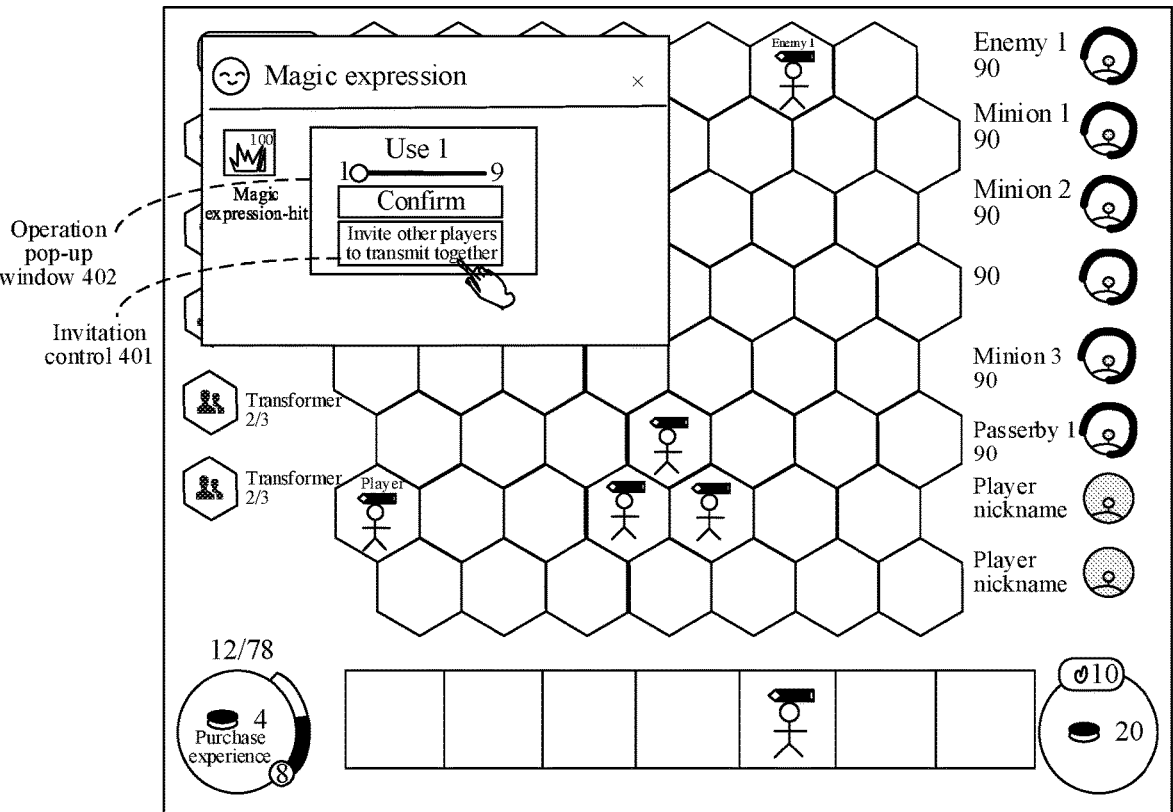
FIG. 4 is a schematic diagram of a virtual resource interaction method according to an embodiment of this disclosure.
Figure 5:
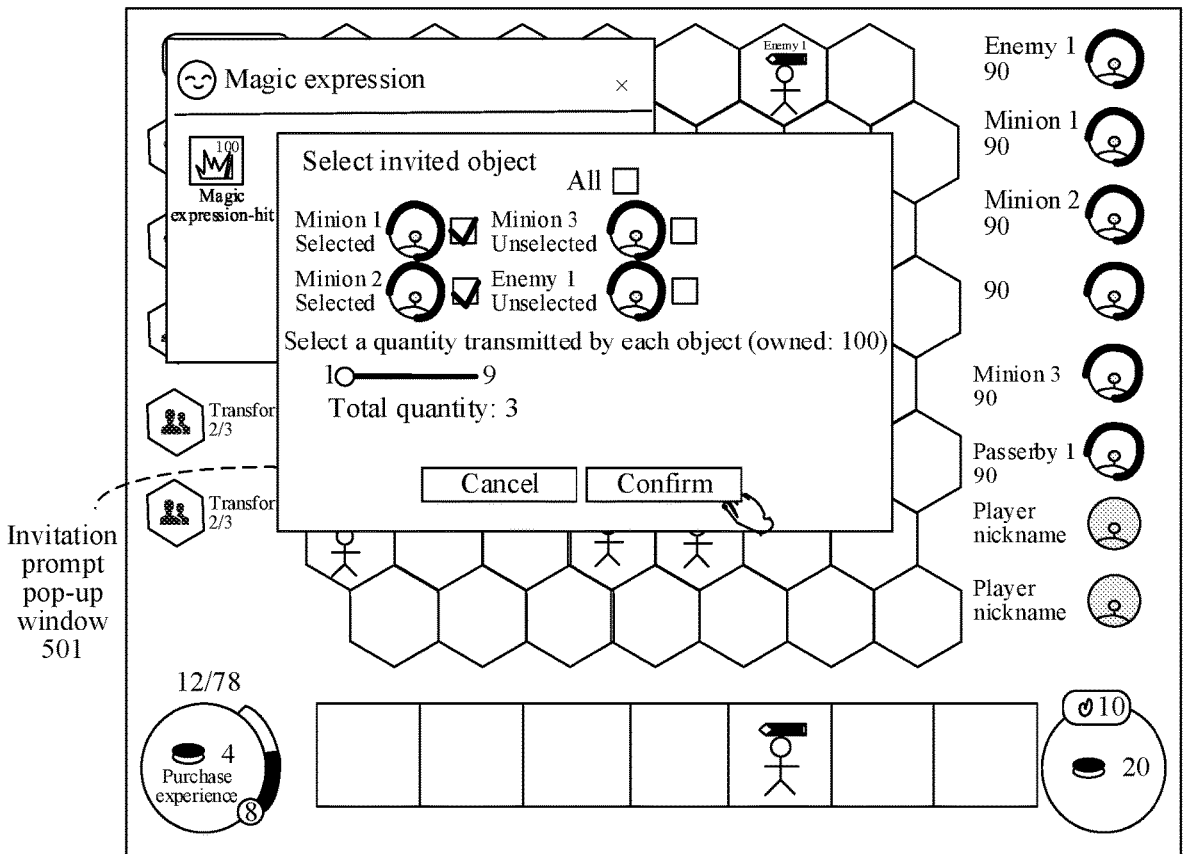
FIG. 5 is a schematic diagram of a virtual resource interaction method according to an embodiment of this disclosure.

The foregoing method is specifically described below with reference to FIG. 3 to FIG. 5. As shown in FIG. 3, a trigger control 301 is a trigger icon indicating a "magic expression", and the "magic expression" is a specific virtual social resource. In response to a tap operation performed on the trigger control 301, sending of the "magic expression" to an opponent player may be directly triggered, that is, a corresponding interaction animation is displayed in an interface. In response to a long press operation performed on the trigger control 301, an operation pop-up window corresponding to virtual social resources may be displayed, as shown in FIG. 4. FIG. 4 shows an operation pop-up window 402 corresponding to virtual social resources and an invitation control 401 displayed on the operation pop-up window 402. As shown in FIG. 4, in response to a tap operation performed on the invitation control 401, an invitation prompt pop-up window is displayed, as shown in FIG. 5. FIG. 5 shows a specific invitation prompt pop-up window 501. In the invitation prompt pop-up window 501, four virtual figure identifiers are shown, which are respectively a "minion 1", a "minion 2", a "minion 3", and an "enemy 1". Corresponding option identifiers are displayed after the four virtual figure identifiers, which may indicate a selection status of each virtual figure. In addition, "select a quantity transmitted by each object" and a slider that may be used to adjust a quantity are further displayed under the four virtual figure identifiers, which are used to indicate quantity option information corresponding to virtual social resources to be transmitted by each virtual figure that accepts an invitation.

According to the foregoing embodiment provided in this disclosure, in response to a press operation performed on virtual social resources, an operation pop-up window corresponding to the virtual social resources is displayed; and in response to a press operation performed on an invitation control, an invitation prompt pop-up window is displayed. Therefore, specific option content for inviting other virtual figures to participate in virtual social resource interaction together is provided, and a technical effect of improving the accuracy of an invitation operation is achieved.

In an embodiment, after the invitation prompt pop-up window is displayed, the method further includes:

S1: Obtain an option identifier of the at least one virtual figure that is selected from the option identifier corresponding to each candidate virtual figure.

S2: Obtain a target resource quantity determined from quantity option information corresponding to the virtual social resources.

S3: Determine the target invitation configuration information based on the obtained option identifier of the at least one virtual figure and the obtained target resource quantity.

The target invitation configuration information is used to indicate related parameter information of transmitted invitation information, and includes, but not limited to, object information of a transmitted invitation and quantity information of virtual social resources to be transmitted.

It may be understood that, after the invitation prompt pop-up window is displayed, invitation configuration information may be determined based on a specific operation in the invitation prompt pop-up window. The foregoing method is specifically described below with reference to FIG. 5. As shown in FIG. 5, after the invitation prompt pop-up window 501 is displayed, in response to a select operation on candidate figures, it is determined that option identifiers of selected virtual figures are the "minion 1" and the "minion 2". Further, for example, a quantity indicated by the slider is "1", which indicates the two selected virtual figures are to be invited to transmit one virtual social resource "magic expression" respectively. In this embodiment, an inviter also transmits, by default, virtual resources whose quantity is same as the set quantity, that is, a virtual figure initiating the invitation also transmits one virtual resource, so that it is determined that a total quantity of virtual social resources that need to be transmitted is "3" based on the foregoing information. Further, an invitation transmitted object may be determined based on the foregoing option identifier information, a quantity of virtual social resources transmitted by each virtual figure is determined based on a selected transmit quantity, and a total quantity of virtual social resources to be transmitted is determined. It may be understood that, the information may be used to form the invitation configuration information.

According to the foregoing embodiment provided in this disclosure, an option identifier of the at least one virtual figure that is selected from the option identifier corresponding to each candidate virtual figure is obtained; a target resource quantity determined from quantity option information corresponding to the virtual social resources is obtained; and the target invitation configuration information is determined based on the obtained option identifier of the at least one virtual figure and the obtained target resource quantity. Therefore, the target invitation configuration information is directly determined through a select operation of a user, thereby improving the virtual social resource interaction efficiency.

In an embodiment, that in a case that target invitation configuration information corresponding to the first virtual figure is determined based on the invitation configuration option information, a social invitation request is transmitted to at least one virtual figure indicated in the target invitation configuration information includes:

S1: Trigger, in a case that the target invitation configuration information is determined, the social invitation request in response to an operation performed on a confirm button displayed in the invitation prompt pop-up window.

S2: Transmit, through a server, the social invitation request to a client at which each virtual figure in the at least one virtual figure is located.

Figure 6:
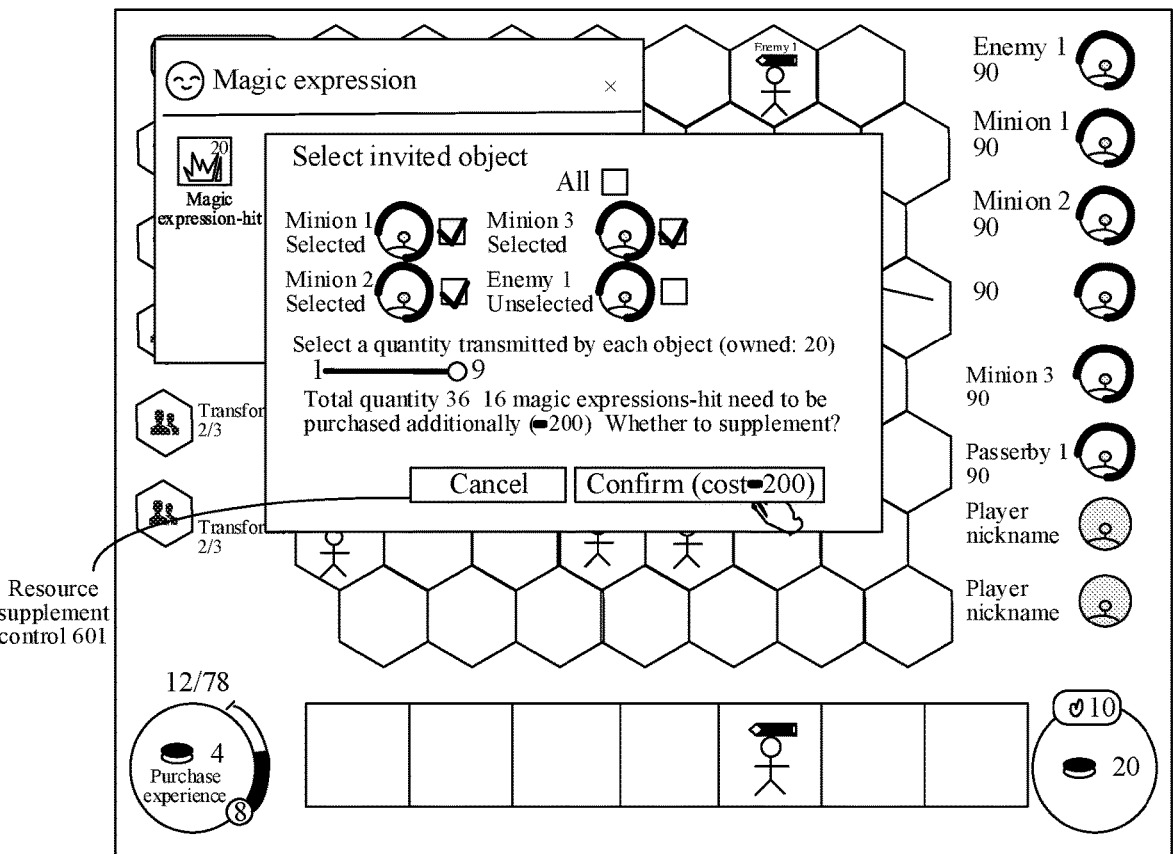
FIG. 6 is a schematic diagram of a virtual resource interaction method according to an embodiment of this disclosure.

The method in this embodiment is further described with reference to FIG. 6. It is determined based on the foregoing information that the total quantity of the virtual social resources that need to be transmitted is "3", and as shown in FIG. 5, in a case that the invitation prompt pop-up window displays that the "minion 1" and the "minion 2" are selected, in response to a tap operation on the confirm button "confirm", a social invitation request is transmitted to the virtual figures "minion 1" and "minion 2" respectively. In an embodiment, the social invitation request may display, after being transmitted to a client at which any virtual figure is located, invitation text information "Player XXX invites you to transmit one magic expression to the player enemy 1 together, whether to accept?" in a form of a pop-up window. In addition, a trigger response operation of a user corresponding to the virtual figure is received.

According to the foregoing embodiment provided in this disclosure, in a case that the target invitation configuration information is determined, the social invitation request is triggered in response to an operation performed on a confirm button displayed in the invitation prompt pop-up window; and the social invitation request is transmitted to a client at which each virtual figure in the at least one virtual figure is located. Therefore, invitation information is accurately transmitted based on the target invitation configuration information, to determine whether an invited object participates in a social resource transmission activity, thereby improving the virtual social resource interaction efficiency.

In an embodiment, before the social invitation request is transmitted to the at least one virtual figure indicated in the target invitation configuration information, the method further includes: deducting all virtual social resources required by the at least one virtual figure indicated in the target invitation configuration information from virtual social resources held by the first virtual figure.

In this embodiment, virtual social resources can be transmitted only in a case that the virtual social resources are pre-configured. In other words, the virtual social resource is a virtual item that may be consumed. In this embodiment, in a case that a quantity of virtual social resources to be consumed is determined before a social invitation is transmitted, a corresponding quantity of virtual social resources may be deducted from the virtual social resources held by the first virtual figure initiates the invitation and transferred to resources of the invited at least one virtual figure, so that the target virtual figure transmits the virtual social resources without consuming virtual social resources owned by the target virtual figure.

The foregoing method is specifically described by using an example in which the virtual social resource is a "magic expression". In this embodiment, the "magic expression" is a resource that may be consumed, and each account can transmit a "magic expression" only when the account owns a specific quantity of "magic expressions" in advance. In this embodiment, assuming that a first account invites two accounts to participate in an activity of transmitting the "magic expression", where each account transmits one "magic expression", and the inviter transmits one "magic expression" by default, three "magic expressions" are deducted from "magic expressions" owned by the first account in advance, and one "magic expression" is added to each invited account, so that the invited account actually may participate in the activity of transmitting the "magic expression" without consuming "magic expression" resources.

According to the embodiment provided in this disclosure, all the virtual social resources required by the at least one virtual figure indicated in the target invitation configuration information are deducted from the virtual social resources held by the first virtual figure, so that the target virtual figure can participate in an activity of transmitting virtual social resources without consuming virtual social resources, thereby enhancing a social attribute of a method for transmitting virtual social resources, and achieving a technical effect of improving participation of the user in transmitting virtual social resources.

In an embodiment, before all the virtual social resources required by the at least one figure indicated in the target invitation configuration information are deducted, the method further includes:

S1: Determine a first resource quantity of virtual social resources to be transmitted by the first virtual figure and a second resource quantity of all the virtual social resources required by the at least one virtual figure.

S2: Obtain a resource quantity of the target virtual social resources through calculation based on the first resource quantity and the second resource quantity.

S3: Determine to deduct all the virtual social resources required by the at least one virtual figure in a case that a resource quantity of the virtual social resources held by the first virtual figure is greater than or equal to the resource quantity of the target virtual social resources.

It is to be understood that, in this embodiment, the first resource quantity of the virtual social resources to be transmitted by the first virtual figure and the second resource quantity of all the virtual social resources to be transmitted by the invited virtual figure are determined respectively, and the resource quantity of the target virtual social resources is determined based on a sum of the first resource quantity and the second resource quantity. In addition, in a case of determining that the resource quantity of the virtual social resources held by the first virtual figure is greater than or equal to the resource quantity of the target virtual social resources, the target resource quantity of virtual social resources are deducted from the virtual social resources held by the first virtual figure before the invitation is transmitted.

Still using the interface shown in FIG. 5 as an example, in this embodiment, it is considered by default that a quantity of virtual resources transmitted by the virtual figure initiating the invitation is consistent with a quantity of virtual resources transmitted by the invited virtual figure. Therefore, in a case of determining that "a quantity transmitted by each object" is "1" and the "minion 1" and the "minion 2" are selected as invited objects, it is determined that a quantity of virtual social resources to be transmitted by the first virtual figure is 1, and a quantity of all virtual social resources to be transmitted by the invited virtual figures is 2, so that it is determined that a total quantity of the target virtual social resources that need to be deducted is 3. In a case that the target resource quantity is determined, because the resource quantity of the virtual social resources held by the virtual figure initiating the invitation is 100, which is greater than the determined total quantity 3 of the transmitted virtual resources, 3 virtual social resources are deducted from the virtual resources held by the virtual figure initiating the invitation, and the invitation information is then transmitted.

According to the foregoing embodiment of this disclosure, a first resource quantity of virtual social resources to be transmitted by the first virtual figure and a second resource quantity of all the virtual social resources required by the at least one virtual figure are determined; a resource quantity of the target virtual social resources is obtained through calculation based on the first resource quantity and the second resource quantity; and all the virtual social resources required by the at least one virtual figure are determined to be deducted in a case that a resource quantity of the virtual social resources held by the first virtual figure is greater than or equal to the resource quantity of the target virtual social resources. Therefore, specific content of a deduct operation on the virtual social resources is accurately determined, thereby improving the accuracy of a virtual social resource transmit operation.

In an embodiment, after the resource quantity of the target virtual social resources is obtained through calculation based on the first resource quantity and the second resource quantity, the method further includes:

S1: Display a resource supplement control in a case that the resource quantity of the virtual social resources held by the first virtual figure is less than the second resource quantity of all the virtual social resources required by the at least one virtual figure, where the resource supplement control is used to supplement a resource quantity of virtual social resources.

S2: Display a resource quantity supplement interaction interface of the virtual social resources in response to an operation performed on the resource supplement control, where the resource quantity supplement interaction interface includes to-be-supplemented candidate virtual social resources and a switch control corresponding to the candidate virtual social resources.

S3: Obtain a switching resource value in response to an operation performed on the switch control, and supplement a resource quantity of virtual social resources corresponding to the switching resource value to the first virtual figure.

It may be understood that, after the resource quantity of the target virtual social resources to be transmitted is determined, whether the resource quantity of the virtual social resources currently held by the first virtual figure meets the resource quantity of the target virtual social resources need to be further determined, and an operation for supplementing virtual social resources is provided in a case that the resource quantity of the virtual social resources currently held by the first virtual figure does not meet the resource quantity of the target virtual social resources, so that the resource quantity of the virtual social resources currently held by the first virtual figure meets the resource quantity of the target virtual social resources, thereby completing a deduct operation on the resource quantity.

Figure 7:
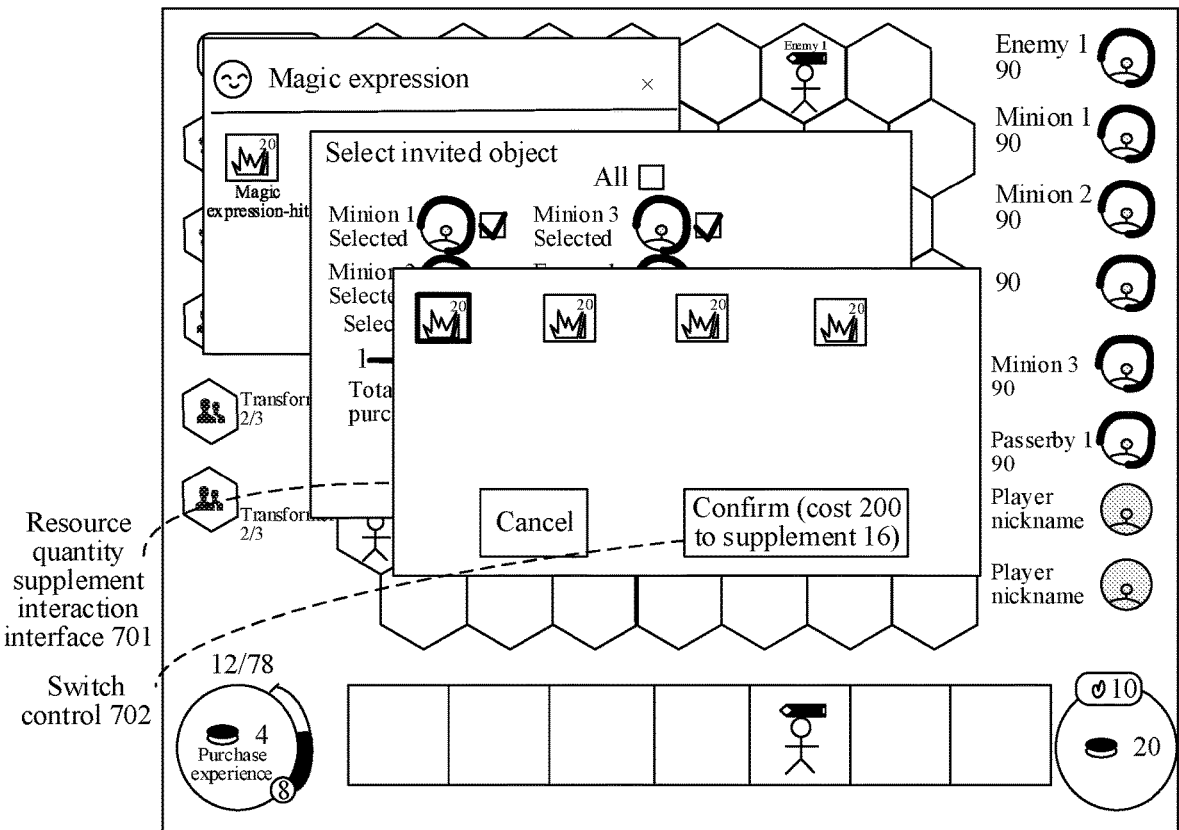
FIG. 7 is a schematic diagram of a virtual resource interaction method according to an embodiment of this disclosure.

The foregoing method is described with reference to FIG. 6 and FIG. 7. FIG. 6 shows that three virtual figures "minion 1", "minion 2", and "minion 3" are selected to transmit invitation information, and a selected transmit quantity is "9". Further, it is determined that a quantity of virtual social resources to be transmitted is 9, a total quantity of virtual social resources to be transmitted by the invited virtual figures is 27, and the virtual figure initiating the invitation transmits 9 "magic expressions", so that it is determined that the resource quantity of the target virtual social resources that need to be deducted is 36 in total. In a case that the target resource quantity is determined, because the resource quantity of the virtual social resources held by the virtual figure initiating the invitation is 20, and the total quantity of virtual resources to be transmitted is 36, prompt information "16 magic expressions need to be purchased additionally" is further displayed, and a resource supplement control 601 used to determine whether to perform virtual social resource supplement is displayed. In response to an operation performed on the resource supplement control, as shown in FIG. 7, a resource quantity supplement interaction interface 701 is displayed, and to-be-supplemented candidate virtual social resources (displayed in bold) and other virtual social resources are displayed in the resource quantity supplement interaction interface 701. In addition, a switch control 702 is displayed below the interface. In a case that the to-be-supplemented candidate virtual social resources are selected by default and a trigger operation on the switch control 702 is received, it is determined to supplement the "16 magic expressions" and supplement the quantity of "magic expressions" to the virtual figure initiating the invitation.

According to this embodiment, a resource supplement control is displayed when the resource quantity of the virtual social resources held by the first virtual figure is less than the second resource quantity of all the virtual social resources required by the at least one virtual figure; a resource quantity supplement interaction interface of the virtual social resources is displayed in response to an operation performed on the resource supplement control; and a switching resource value is obtained in response to an operation performed on a switch control, and the resource quantity of the virtual social resources corresponding to the switching resource value is supplemented to the first virtual figure, to supplement the virtual social resources in a case that the held virtual social resources are not enough. Therefore, completion of virtual social resource interaction is ensured, and a technical effect of improving the operation efficiency of a virtual social resource interaction operation is achieved.

In an embodiment, that an interaction picture of target virtual social resources in the virtual scenario is displayed includes:

S1: Display an interaction countdown in the virtual scenario, where the interaction countdown is used to prompt remaining duration for the target virtual social resources to be transmitted to the second virtual figure.

S2: Display, in a case that an end moment of the interaction countdown is reached, the target virtual figure and the first virtual figure that enter the virtual scenario, and transmit the interaction picture of the target virtual social resources to the second virtual figure.

Figure 8:
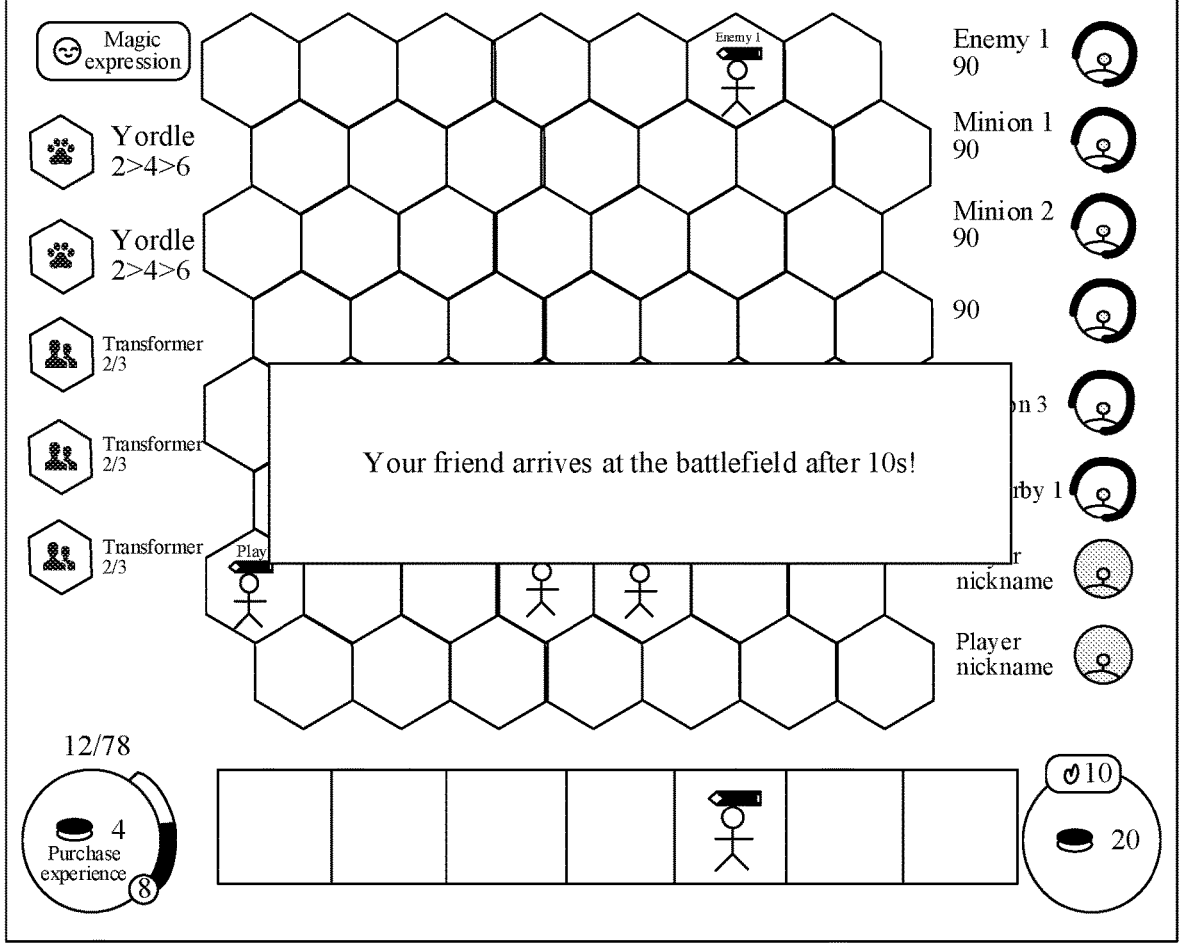
FIG. 8 is a schematic diagram of a virtual resource interaction method according to an embodiment of this disclosure.

It may be understood that, after the invitation is transmitted and before the invited virtual figure accepts the invitation, a countdown prompt message may be displayed in a client corresponding to the first virtual figure. As shown in FIG. 8, in an embodiment, a prompt message "Your friend arrives at the battlefield after 10 s" may be displayed in the interface to indicate that the invited virtual figure accepts the invitation and remaining waiting duration for the invited virtual figure to be teleported to the game interface and transmit the virtual social resources together.

Figure 9:
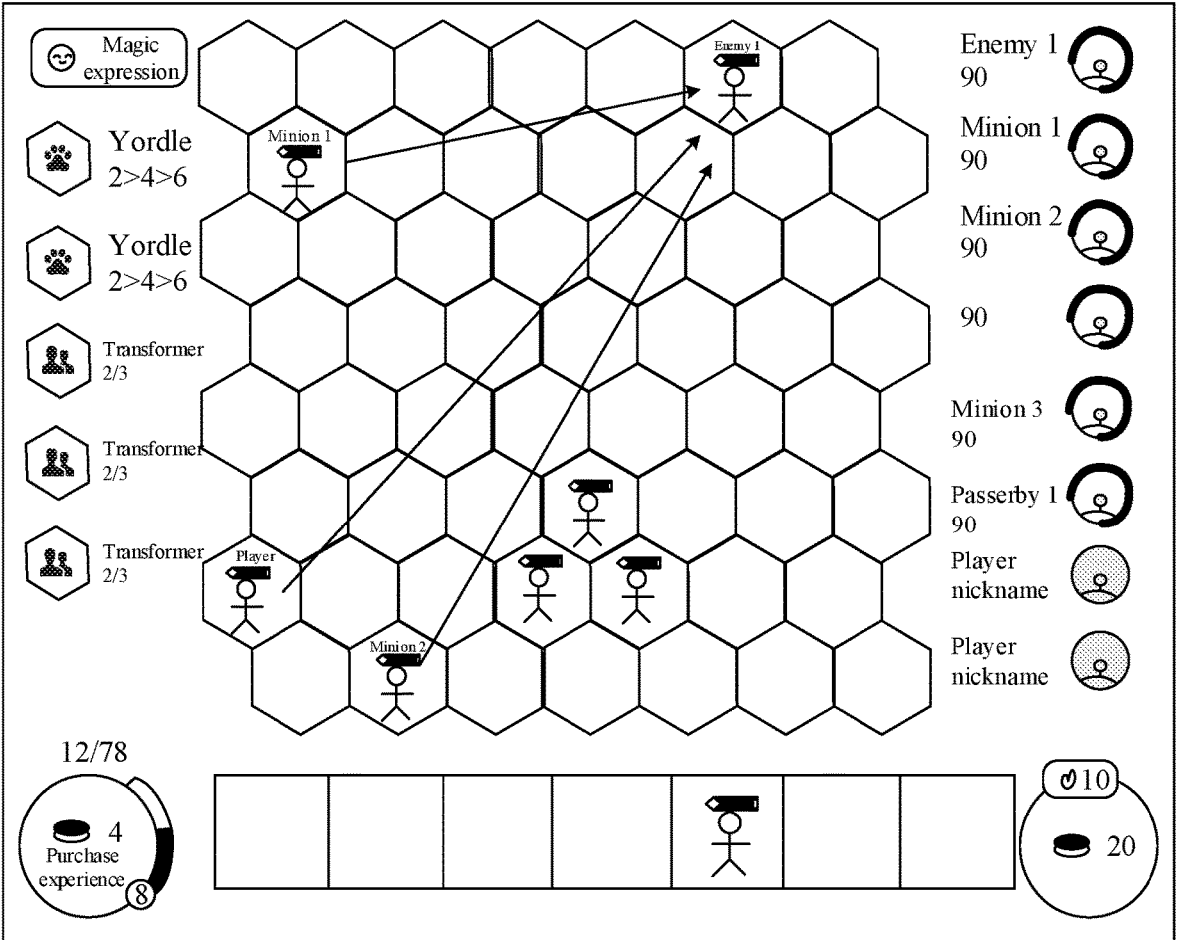
FIG. 9 is a schematic diagram of a virtual resource interaction method according to an embodiment of this disclosure.

As shown in FIG. 9, at the end moment of the countdown, the "minion 1" and the "minion 2" that accept the invitation are teleported to the virtual scenario in which the first virtual figure is located, and an interaction picture that the first virtual figure "player" and the invited virtual figures "minion 1" and "minion 2" transmit the virtual social resource "magic expression" to the second virtual figure "enemy 1" is displayed. In an embodiment, in a case that the selected "magic expression" is "hit", animation display effects of "attack" sequentially performed by the "player", the "minion 1", and the "minion 2" to the "enemy 1" may be displayed. It is to be understood that, the animation herein merely generates an entertainment effect and does not cause substantive damage such as a "hot point reduction" effect to the "enemy 1".

It is to be understood that, assuming that the virtual figure "minion 1" accepts the invitation but the "minion 2" does not accept the invitation, the "minion 1" is teleported to the virtual scenario shown in FIG. 3, and merely a display effect that the "minion 1" transmits the "magic expression" is displayed.

In another case, assuming that a network abnormality occurs during transmission of the invitation information, and merely the "minion 1" accepts the invitation information, the "minion 1" is teleported to the interface shown in FIG. 9, and merely a display effect that the "minion 1" transmits the "magic expression" is displayed.

In another case, assuming that a network delay exists in clients corresponding to the "minion 1" and the "minion 2" that accept the invitation, display of the animations may also be correspondingly delayed. A specific delayed display occasion is not limited herein.

According to the foregoing embodiment of this disclosure, an interaction countdown is displayed in the virtual scenario, where the interaction countdown is used to prompt remaining duration for the target virtual social resources to be transmitted to the second virtual figure; and in a case that an end moment of the interaction countdown is reached, the target virtual figure and the first virtual figure that enter the virtual scenario are displayed, and the interaction picture of the target virtual social resources is transmitted to the second virtual figure. Therefore, interaction is not limited to a fixed one-to-one interaction form, thereby overcoming a problem that a virtual social resource interaction form is relatively single in the related art. Further, an embodiment of this disclosure may provide a new interaction manner for a terminal device controlling a plurality of virtual figures to transmit interaction information (for example, the interaction picture of the target virtual social resources) to a same terminal device, thereby improving the convenience of a user in interacting with a plurality of terminal devices and improving the operation convenience.

In an embodiment, after the interaction picture of the target virtual social resources is transmitted to the second virtual figure, the method further includes:

S1: Obtain, in a case that a first quantity of target virtual figures accepting the social invitation request is greater than a second quantity of target virtual figures entering the virtual scenario, a first quantity difference between the first quantity and the second quantity.

S2: Return first differential virtual social resources (i.e., a first differential resource amount of virtual social interactions) matching the first quantity difference to the first virtual figure.

It is to be understood that, after the interaction picture is displayed, a case that not all invited virtual figures accept the invitation and transmit virtual resources may exist, but the virtual social resources have been deducted based on the quantity of all the invited virtual figures in advance before the invitation is transmitted. Therefore, a quantity of virtual social resources that need to be returned to the first virtual figure needs to be determined based on a difference between a quantity of virtual figures actually accepting the invitation and a quantity of virtual figures included in the transmitted invitation.

In this embodiment, in a case that the first quantity of target virtual figures accepting the social invitation request is greater than or equal to the second quantity of target virtual figures entering the virtual scenario, the first quantity difference between the first quantity and the second quantity is obtained; and the first differential virtual social resources matching the first quantity difference are returned to the first virtual figure. Therefore, a technical effect of improving the virtual social resource interaction accuracy is achieved.

In an embodiment, after the interaction countdown is displayed in the virtual scenario, the method further includes:

S1: Determine, in a case that a part of virtual figures in the at least one virtual figure (i.e., a subset of virtual figures in the at least one virtual figure) accept the social invitation request, the part of virtual figures as the target virtual figure.

S2: Obtain a second quantity difference between a third quantity of the at least one virtual figure and a fourth quantity of the part of virtual figures.

S3: Return second differential virtual social resources matching the second quantity difference to the first virtual figure.

It is to be understood that, after the interaction picture is displayed, a quantity of virtual social resources that are actually consumed needs to be determined based on a situation of the interaction picture that is actually displayed, to determine a difference between the quantity of the virtual social resources that are actually consumed and a quantity deducted from the virtual social resources held by the first virtual figure in advance, and the difference quantity is re-supplemented to the first virtual figure. In other words, in this embodiment, a part of virtual resources may be deducted in advance before the first virtual figure transmits the invitation, the deducted virtual resources may be stored in a server, and a quantity of virtual social resources that need to be returned to the first virtual figure is determined based on an actual invitation accept response and a quantity of virtual social resources that are actually transmitted to the second virtual figure. A specific calculation manner may be as follows: the quantity of the virtual social resources (i.e., a resource amount of virtual social interactions) that need to be returned to the first virtual figure may be determined based on a product of a difference between the quantity of all the invited virtual figures and the quantity of the virtual figures that actually accept the invitation and a preset quantity of virtual social resources transmitted by each virtual figure.

For example, before the first virtual figure invites three target virtual figures to transmit three "magic expressions" respectively, 12 "magic expressions may be deducted from held "magic expressions" in advance, and in a case that merely two virtual figures are invited, 9 "magic expressions" are actually transmitted, so that the server returns three "magic expressions" that are deducted in advance to the first virtual figure.

In this embodiment, in a case that a part of virtual figures in the at least one virtual figure accept the social invitation request, the part of virtual figures are determined as the target virtual figure; a second quantity difference between a third quantity of the at least one virtual figure and a fourth quantity of the part of virtual figures is determined; and second differential virtual social resources matching the second quantity difference are returned to the first virtual figure. Therefore, a technical effect of improving the virtual social resource interaction accuracy is achieved.

In an embodiment, before the interaction picture of the target virtual social resources is displayed in the virtual scenario, the method further includes: stopping, before the end moment of the interaction countdown is reached, transmitting the target virtual social resources to the second virtual figure in a case that the first virtual figure or the second virtual figure meets an interference condition, and returning the target virtual social resources to the first virtual figure, where it is determined that the first virtual figure meets the interference condition in a case that a defense resource value of the first virtual figure reaches zero, or it is determined that the second virtual figure meets the interference condition in a case that a defense resource value of the second virtual figure reaches zero.

It is to be understood that, in this embodiment, there is a precondition for transmitting the virtual social resources to the second virtual figure, that is, a defense resource value of a virtual figure transmitting or receiving the virtual social resources is not zero. In a case that a defense resource value of a virtual figure that prepares to transmit the virtual social resources or a virtual figure that prepares to receive the virtual social resources is 0, it is considered as an interference condition, and an operation procedure of transmitting the virtual social resources is stopped.

For example, before an interaction picture of the virtual social resources is displayed, if a hit point of the first virtual figure is reduced to 0 under attack of the second virtual figure, an operation procedure that the first virtual figure transmits a "magic expression" to the second virtual figure is stopped. Correspondingly, because the first virtual figure actually does not transmit the "magic expression", but a corresponding quantity of "magic expression" has been deducted in a previous operation procedure, the deducted "magic expression" is returned to the first virtual figure in a case of determining to stop transmitting the "magic expression". In another example, before an interaction picture of the virtual social resources is displayed, if a hit point of the second virtual figure is reduced to 0 under attack of the first virtual figure, it indicates that the second virtual figure is attacked and "eliminated", and there is no need to continue to transmit the "magic expression". That is, an operation procedure that the first virtual figure transmits the "magic expression" to the second virtual figure is stopped, and correspondingly, the deducted "magic expression" is returned to the first virtual figure.

In another embodiment, in a case that the invited virtual figure meets the interference condition, feedback of the invitation information may be controlled to be stopped. That is, in another embodiment, if a hit point of the invited virtual figure is reduced to 0, the invitation operation is canceled by default.

According to the embodiments of this disclosure, in a case that the first virtual figure or the second virtual figure meets the interference condition, transmission of the target virtual social resources to the second virtual figure is stopped, and the target virtual social resources are returned to the first virtual figure, thereby achieving a technical effect of improving the virtual social resource interaction accuracy.

In an embodiment, after the interaction picture of the target virtual social resources is displayed in the virtual scenario, the method further includes: displaying a teleport prop in the virtual scenario, where the teleport prop is used to teleport the target virtual figure to an original virtual scenario.

It is to be understood that, after transmission of the virtual social resources by the invited virtual figure is displayed, the invited virtual figure further needs to return a game scenario or a game interface in which the invited virtual figure is located. Therefore, a teleport prop is displayed in the virtual scenario, to indicate to teleport the invited virtual figure to the original virtual scenario.

According to the foregoing embodiment of this disclosure, an effect that the invited virtual figure is teleported to the original virtual scenario is achieved in a manner of displaying a teleport prop in the virtual scenario, thereby further improving the richness of the virtual social resource interaction manner.

In another embodiment, the virtual social resource interaction method includes:

S1: Display a virtual scenario provided by a battle game task, where the virtual scenario includes a third virtual figure and a second virtual figure that participate in the battle game task and belong to different camps. For example, the third virtual figure is a virtual figure in the at least one virtual figure indicated in the target invitation configuration information above.

S2: Display a social invitation prompt pop-up window in the virtual scenario, where the social invitation prompt pop-up window carries a social invitation request transmitted by a first virtual figure.

S3: Control, in a case of determining that the third virtual figure accepts the social invitation request, the third virtual figure to enter a target virtual scenario in which the first virtual figure is located.

S4: Display an interaction picture of target virtual social resources in the target virtual scenario, where the target virtual social resources are virtual social resources transmitted by the third virtual figure and the first virtual figure to the second virtual figure.

The foregoing method is described with reference to FIG. 9 and FIG. 10. As shown in FIG. 10, assuming that the third virtual figure is a "minion 1" and the second virtual figure is a "minion 2", a virtual game scenario corresponding to the "minion 1" is displayed. In addition, a scenario invitation request pop-up window transmitted by the first virtual figure "my rich friend" is displayed in the virtual scenario, where invitation content "Player my rich friend invites you to transmit 9 magic expressions-hit to the player enemy 1 together, whether to accept: this invitation will be automatically accepted if this invitation is not accepted within 10 s (00:07)", and an accept control and a reject control are displayed.

In a case of determining that the third virtual figure "minion 1" accepts the social invitation request, as shown in FIG. 9, the third virtual figure "minion 1" is controlled to enter a virtual game scenario in which the first virtual figure "my rich friend" is located, and the interaction picture of the target social resources is displayed.

According to the foregoing embodiment of this disclosure, the virtual scenario provided by the battle game task is provided; the social invitation prompt pop-up window is displayed in the virtual scenario; in a case of determining that the third virtual figure accepts the social invitation request, the third virtual figure is controlled to enter the target virtual scenario in which the first virtual figure is located; and the interaction picture of the target virtual social resources is displayed in the target virtual scenario. Therefore, a resource interaction process between the third virtual figure and the second virtual figure may be more enriched and diversified rather than being limited to a fixed one-toone interaction form, thereby overcoming a problem that a virtual social resource interaction form is relatively single in the related art.

In an embodiment, after the social invitation prompt pop-up window is displayed in the virtual scenario, the method further includes:

S1: Display an invitation countdown, where the invitation countdown is used to prompt remaining duration for the third virtual figure to accept the social invitation request.

S2: Determine, before an end moment of the invitation countdown is reached, that the third virtual figure accepts the social invitation request in response to detecting an operation performed on a confirm button displayed in the invitation prompt pop-up window.

It may be understood that, in a case that the third virtual figure receives social invitation information transmitted by the first virtual figure, the third virtual figure needs a specific time to consider whether to participate. Therefore, the invitation countdown is displayed, and the provided confirm button is used to determine that the third virtual figure accepts the social invitation request.

According to the foregoing embodiment of this disclosure, an invitation countdown is displayed, where the invitation countdown is used to prompt remaining duration for the third virtual figure to accept the social invitation request; and before an end moment of the invitation countdown is reached, that the third virtual figure accepts the social invitation request is determined in response to detecting an operation performed on a confirm button displayed in the invitation prompt pop-up window. In this way, a decision time for a user object controlling the third virtual figure to consider whether to participate in virtual social is provided, thereby overcoming a problem that a virtual social resource interaction form is relatively single in the related art.

In an embodiment, after the invitation countdown is displayed, the method further includes: determining, before the end moment of the invitation countdown is reached, that the third virtual figure accepts the social invitation request in response to detecting no operation performed on a button in the invitation prompt pop-up window.

It may be understood that, in this embodiment, before the countdown ends, if no operation is detected on the confirm button or a cancel button, it is determined by default that the third virtual figure accepts the virtual social invitation.

According to the foregoing embodiment of this disclosure, before the end moment of the invitation countdown is reached, in response to detecting no operation performed on the button in the invitation prompt pop-up window, it is determined that the third virtual figure accepts the social invitation request. In this way, it is determined by default that the third virtual figure that does not perform a select operation accepts the virtual social invitation, thereby improving the participation in a virtual social resource interaction activity, so that a resource interaction process between virtual figures may be more enriched and diversified.

In an embodiment, the control the third virtual figure to enter a target virtual scenario in which the first virtual figure is located includes:

S1: Display a teleport prop in the virtual scenario, where the teleport prop is used to teleport the third virtual figure to the target virtual scenario in which the first virtual figure is located.

S2: Display a process picture in which the third virtual figure is teleported to the target virtual scenario through the teleport prop.

It is to be understood that, in this embodiment, to enrich a display effect that the third virtual figure is teleported to the virtual scenario of the first virtual figure, a teleport prop is displayed in the virtual scenario of the third virtual figure, and a process animation in the teleport process is displayed. It may be understood that, the teleport prop may be a virtual vehicle such as a small airplane, a small car, or a small rocket, or may be a virtual mount such as a small dinosaur or a small monster, or may be in a form of a teleport inlet such as an optical ring or a water ring. A specific form of the teleport prop is not limited herein. It may be understood that, corresponding to the virtual vehicle or the virtual mount, the process animation may be in an animation mode that the third virtual figure rides the virtual vehicle or the virtual mount and gradually disappears; and corresponding to the virtual teleport inlet, the process animation may be in an animation mode that the third virtual figure enters the virtual teleport inlet and gradually disappears. A specific display manner of the process animation is not limited herein.

According to the foregoing embodiment of this disclosure, a teleport prop is displayed in the virtual scenario, and a process picture that the third virtual figure is teleported to the target virtual scenario through the teleport prop is displayed, so that a teleport process of the third virtual figure is displayed, and a resource interaction process between virtual figures may be more enriched and diversified.

In an embodiment, before the interaction picture of the target virtual social resources is displayed in the target virtual scenario, the method further includes: obtaining a target resource quantity of virtual social resources configured (i.e., assigned) by the first virtual figure for the third virtual figure, where the target resource quantity is a resource quantity of virtual social resources transmitted by the third virtual figure to the second virtual figure.

It may be understood that, before the third virtual figure accepts the invitation, a quantity of virtual social resources to be transmitted has been determined based on a control operation of the first virtual figure, so that a corresponding quantity of virtual social resources may be automatically transmitted in the virtual scenario of the first virtual figure in a case that the third virtual figure merely needs to accept the invitation.

According to the foregoing embodiment of this disclosure, before the interaction picture of the target virtual social resources is displayed in the target virtual scenario, a target resource quantity of virtual social resources configured by the first virtual figure for the third virtual figure is obtained, so that a technical effect that the third virtual figure automatically transmits a corresponding quantity of virtual social resources is achieved, and a resource interaction process between virtual figures may be more enriched and diversified.

In an embodiment, after the invitation countdown is displayed, the method further includes:

S1: Determine, before the end moment of the invitation countdown is reached, that the third virtual figure rejects the social invitation request in response to detecting an operation performed on a reject button displayed in the invitation prompt pop-up window.

S2: Return virtual social resources configured for the third virtual figure to the first virtual figure.

It may be understood that, in a case that the third virtual figure rejects the invitation, the virtual social resources pre-configured for the third virtual figure may be returned to the first virtual figure. In other words, the first virtual figure merely consumes the held virtual social resources for a virtual figure that actually accepts the invitation and a virtual social resource transmit operation that occurs.

According to the foregoing embodiment of this disclosure, before the end moment of the invitation countdown is reached, it is determined that the third virtual figure rejects the social invitation request in response to detecting an operation performed on a reject button displayed in the invitation prompt pop-up window; and the virtual social resources configured for the third virtual figure are returned to the first virtual figure. Therefore, the first virtual figure merely needs to consume virtual social resources for a virtual social resource transmit operation that actually occurs, thereby improving the accuracy of a resource interaction process between virtual figures.

In an embodiment, before the interaction picture of the target virtual social resources is displayed in the target virtual scenario, the method further includes: stopping transmitting the target virtual social resources to the second virtual figure in a case that the first virtual figure or the second virtual figure meets an interference condition, where it is determined that the first virtual figure meets the interference condition in a case that a defense resource value of the first virtual figure reaches zero, or it is determined that the second virtual figure meets the interference condition in a case that a defense resource value of the second virtual figure reaches zero.

It is to be understood that, in this embodiment, there is a precondition for transmitting the virtual social resources to the second virtual figure, that is, a defense resource value of a virtual figure transmitting or receiving the virtual social resources is not zero. In a case that a defense resource value of a virtual figure that prepares to transmit the virtual social resources or a virtual figure that prepares to receive the virtual social resources is 0, it is considered as an interference condition, and an operation procedure of transmitting the virtual social resources is stopped.

For example, before an interaction picture of the virtual social resources is displayed, if a hit point of the first virtual figure is reduced to 0 under attack of the second virtual figure, an operation procedure that the first virtual figure transmits a "magic expression" to the second virtual figure is stopped. Correspondingly, because the first virtual figure actually does not transmit the "magic expression", but a corresponding quantity of "magic expression" has been deducted in a previous operation procedure, the deducted "magic expression" is returned to the first virtual figure in a case of determining to stop transmitting the "magic expression". In another example, before an interaction picture of the virtual social resources is displayed, if a hit point of the second virtual figure is reduced to 0 under attack of the first virtual figure, it indicates that the second virtual figure is attacked and "eliminated", and there is no need to continue to transmit the "magic expression". That is, an operation procedure that the first virtual figure transmits the "magic expression" to the second virtual figure is stopped, and correspondingly, the deducted "magic expression" is returned to the first virtual figure.

According to the foregoing embodiment of this disclosure, in a case that the first virtual figure or the second virtual figure meets an interference condition, transmission of the target virtual social resources to the second virtual figure is stopped. In this way, the first virtual figure merely needs to consume virtual social resources for a virtual social resource transmit operation that actually occurs, thereby improving the accuracy of a resource interaction process between virtual figures.

In an embodiment, after the interaction picture of the target virtual social resources is displayed in the target virtual scenario, the method further includes: displaying a teleport prop in the target virtual scenario, where the teleport prop is used to teleport the third virtual figure from the target virtual scenario back to the virtual scenario.

It is to be understood that, in this embodiment, to enrich a display effect that the third virtual figure is teleported back to the virtual scenario of the third virtual figure, a teleport prop is displayed in the virtual scenario of the figure virtual figure. It may be understood that, the teleport prop may be same as or different from the teleport prop displayed in the process of being teleported to the virtual scenario in which the first virtual figure is located, and the teleport prop may be a virtual vehicle such as a small airplane, a small car, or a small rocket, or may be a virtual mount such as a small dinosaur or a small monster, or may be in a form of a teleport inlet such as an optical ring or a water ring. A specific form of the teleport prop is not limited herein.

In an embodiment, a process animation in the teleport process may be further displayed in the virtual scenario of the first virtual figure. It may be understood that, corresponding to the virtual vehicle or the virtual mount, the process animation may be in an animation mode that the third virtual figure rides the virtual vehicle or the virtual mount and gradually disappears; and corresponding to the virtual teleport inlet, the process animation may be in an animation mode that the third virtual figure enters the virtual teleport inlet and gradually disappears. A specific display manner of the process animation is not limited herein.

According to the foregoing embodiment of this disclosure, after the interaction picture of the target virtual social resources is displayed in the target virtual scenario, the method further includes: displaying a teleport prop in the target virtual scenario, so that a resource interaction process between virtual figures may be more enriched and diversified.

A complete process of the virtual resource interaction method provided in this disclosure is specifically described below with reference to a procedure shown in FIG. 11.

Step S1102 is first performed, where an inviter selects a magic expression.

The determination step S1104 is then performed, to determine whether to long press a magic expression identifier, and in a case that the magic expression identifier is not long pressed (for example, tapped), step S1104-1 is performed to directly transmit the magic expression to an opponent. In a case that the magic expression identifier is long pressed, step S1104-2 is performed.

For example, in step S1104-2, an invitation interface is displayed.

Step S1106 is then performed, to determine an invitation parameter.

The foregoing steps are specifically described below with reference to FIG. 3 to FIG. 5. First, in the interface shown in FIG. 3, the inviter performs a trigger operation on the trigger control 301, to determine a selected "magic expression". As shown in the figure, the trigger control 301 is a trigger icon indicating a "magic expression". In response to a tap operation performed on the trigger control 301, the selected "magic expression" may be directly transmitted to an opponent player, that is, a corresponding interaction animation is directly displayed in the interface. In response to a long press operation performed on the trigger control 301, an invitation interface corresponding to the "magic expression" may be displayed, as shown in FIG. 4. FIG. 4 shows an operation pop-up window 402 corresponding to the "magic expression" and an invitation control 401 displayed on the operation pop-up window 402. As shown in FIG. 4, in response to a tap operation performed on the invitation control 401, an invitation prompt pop-up window is displayed, as shown in FIG. 5. FIG. 5 shows a specific invitation prompt pop-up window 501. In the invitation prompt pop-up window 501, four virtual figure identifiers are shown, which are respectively a "minion 1", a "minion 2", a "minion 3", and an "enemy 1". Corresponding option identifiers are displayed after the four virtual figure identifiers, which may indicate a selection status of each virtual figure. In addition, "select a quantity transmitted by each object" and a slider that may be used to adjust a quantity are further displayed under the four virtual figure identifiers, which are used to indicate quantity option information corresponding to virtual social resources to be transmitted by each virtual figure that accepts an invitation. An invitation parameter may be determined based on a select operation performed in the invitation prompt pop-up window shown in FIG. 5.

Step S1108 is then performed, to determine whether a quantity of remaining magic expressions is enough, and step S1108-2 is performed in a case that the quantity is enough; and S1108-1 is performed in a case that the quantity is not enough.

It may be understood that, according to the invitation parameter determined based on an operation in the invitation interface, quantity information of "magic expressions" that need to be transmitted by the inviter in total may be determined. The inviter is supported in inviting friends to transmitting a corresponding quantity of "magic expressions" only in a case that a quantity of "magic expressions" held by the inviter meets a quantity of to-be-transmitted "magic expressions".

For example, in step S1108-1, a recharge operation is performed.

It may be understood that, in a case that the quantity of the "magic expressions" is not enough, an operation is required to supplement "magic expressions", to continue to perform the subsequent operation S1108-2.

For example, in step S1108-2, a determined quantity of magic expressions are deducted, and invitation information is transmitted.

In a case of determining that the quantity of "magic expressions" held by the inviter can meet the quantity of to-be-transmitted "magic expressions", the determined quantity of "magic expressions" are first deducted, and the invitation information is then transmitted based on to-be-invited objects determined in the invitation parameter.

The determination step S1110 is then performed, to determine whether an interference condition exists, and step S1114 is performed in a case that the interference condition exists; and step S1112 is performed in a case that the interference condition does not exist.

In this embodiment, the interference condition includes: a hit point of the inviter is 0; a hit point of an opponent is 0; and a hit point of an invitee is 0. In other words, in a process of transmitting the "magic expression", if any one of the inviter, the invitee, or an expression recipient is "dead", the interference condition is reached, transmission of the "magic expression" is stopped, and step S1114 is directly performed.

In a case that the interference condition does not exist, step S1112 is performed, to transmit magic expressions based on a quantity of users that are actually invited.

That is, after the invitation is transmitted, situations that an invited user does not receive the invitation information or rejects the invitation, in a case that the foregoing situations occur, the invited user cannot be actually invited to the virtual scenario of the inviter to transmit "magic expressions". Therefore, in this step, the magic expressions are transmitted based on the quantity of the users that are actually invited.

In step S1114, magic expressions are returned based on an actual transmitted quantity.

It may be understood that, because a specific quantity of "magic expressions" are deducted in advance based on all invited users, in a case that transmission ends or expressions are not actually transmitted, "magic expressions" that are additionally deducted need to be returned to the inviter based on the actual transmitted quantity.

The procedure shown in FIG. 11 is merely an example, and this embodiment is not limited thereto.

In this embodiment of this disclosure, a pick-up list matching a current position in which the target virtual character is located is displayed, and in response to a control operation performed on a target object in the pick-up list, the target object is moved from the pick-up list to a virtual resource interaction region corresponding to an operation type of the control operation. Therefore, by setting control operations corresponding to different operation types, the target object is moved to management regions of different types, thereby resolving the technical problem that the object management efficiency is low in the related art.

To make the description simple, the foregoing method embodiments are stated as a series of action combinations. However, a person skilled in the art needs to know that this disclosure is not limited to the described sequence of the actions because according to this disclosure, some steps may use another sequence or may be simultaneously performed. In addition, a person skilled in the art is further to understand that the embodiments described in this specification are exemplary embodiments, and the involved actions and modules are not necessarily required by this disclosure.

Figure 12:
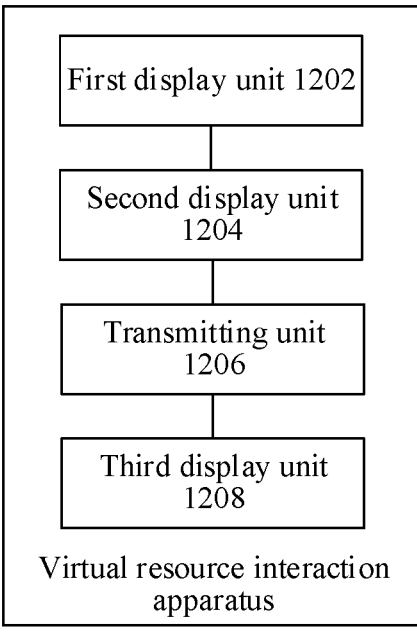
FIG. 12 is a schematic structural diagram of a virtual resource interaction apparatus according to an embodiment of this disclosure.

According to another aspect of the embodiments of this disclosure, a virtual resource interaction apparatus configured to implement the virtual resource interaction method is further provided. As shown in FIG. 12, the apparatus includes:

a first display unit 1202, configured to display a virtual scenario provided by a battle game task, the virtual scenario including a first virtual figure and a second virtual figure that participate in the battle game task and belong to different camps;

a second display unit 1204, configured to display an invitation prompt pop-up window in response to a trigger operation performed on a trigger control corresponding to virtual social resources, the invitation prompt pop-up window displaying to-be-configured invitation configuration option information;

a transmitting unit 1206, configured to transmit, in a case that target invitation configuration information corresponding to the first virtual figure is determined based on the invitation configuration option information, a social invitation request to at least one virtual figure indicated in the target invitation configuration information; and a third display unit 1208, configured to display, in a case that a target virtual figure in the at least one virtual figure accepts the social invitation request, an interaction picture of target virtual social resources in the virtual scenario, the target virtual social resources being virtual social resources transmitted by the first virtual figure and the target virtual figure to the second virtual figure based on the target invitation configuration information.

Figure 13:
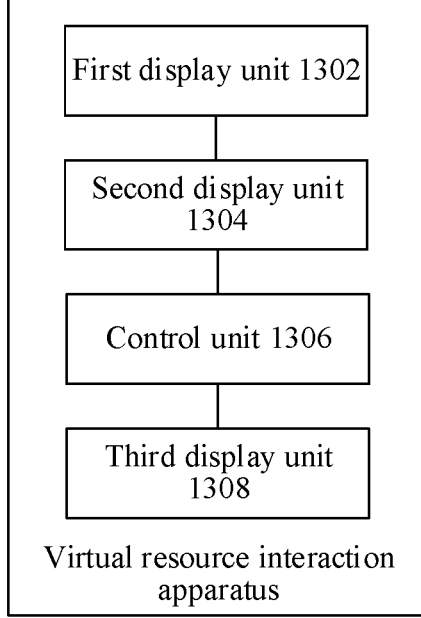
FIG. 13 is a schematic structural diagram of a virtual resource interaction apparatus according to an embodiment of this disclosure.

According to another aspect of the embodiments of this disclosure, another virtual resource interaction apparatus configured to implement the virtual resource interaction method is further provided. As shown in FIG. 13, the apparatus includes:

a first display unit 1302, configured to display a virtual scenario provided by a battle game task, the virtual scenario comprising a third virtual figure and a second virtual figure that participate in the battle game task and belong to different camps;

a second display unit 1304, configured to display a social invitation prompt pop-up window in the virtual scenario, the social invitation prompt pop-up window carrying a social invitation request transmitted by a first virtual figure;

a control unit 1306, configured to control, in a case of determining that the third virtual figure accepts the social invitation request, the third virtual figure to enter a target virtual scenario in which the first virtual figure is located; and a third display unit 1308, configured to display an interaction picture of target virtual social resources in the target virtual scenario, the target virtual social resources being virtual social resources transmitted by the third virtual figure and the first virtual figure to the second virtual figure.

In this embodiment, for embodiments to be implemented by the units and modules, reference may be made to the foregoing method embodiments, and details are not described herein again.

Figure 14:
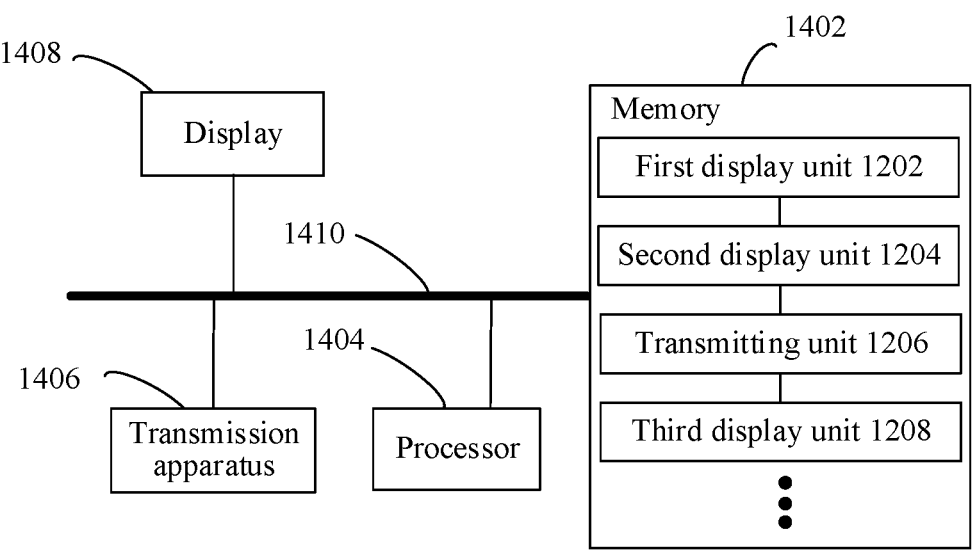
FIG. 14 is a schematic structural diagram of an electronic device according to an embodiment of this disclosure.

According to still another aspect of the embodiments of this disclosure, an electronic device configured to implement the virtual resource interaction method is further provided. The electronic device may be a terminal device or a server shown in FIG. 14. This embodiment is described by using an example in which the electronic device is a terminal device. As shown in FIG. 14, the electronic device includes a memory 1402 and a processor 1404. The memory 1402 stores a computer program. The processor 1404 is configured to perform the steps in any one of the foregoing method embodiments by executing the computer program.

In this embodiment, the electronic device may be located in at least one of a plurality of network devices in a computer network.

In this embodiment, the processor may be configured to perform the following steps by executing the computer program.

S1: Display a virtual scenario provided by a battle game task, where the virtual scenario includes a first virtual figure and a second virtual figure that participate in the battle game task and belong to different camps.

S2: Display an invitation prompt pop-up window in response to a trigger operation performed on a trigger control corresponding to virtual social resources, where the invitation prompt pop-up window displays to-be-configured invitation configuration option information.

S3: Transmit, in a case that target invitation configuration information corresponding to the first virtual figure is determined based on the invitation configuration option information, a social invitation request to at least one virtual figure indicated in the target invitation configuration information.

S4: Display, in a case that a target virtual figure in the at least one virtual figure accepts the social invitation request, an interaction picture of target virtual social resources in the virtual scenario, where the target virtual social resources are virtual social resources transmitted by the first virtual figure and the target virtual figure to the second virtual figure based on the target invitation configuration information.

In this embodiment, the processor may alternatively be configured to perform the following steps by executing the computer program.

S1: Display a virtual scenario provided by a battle game task, where the virtual scenario includes a third virtual figure and a second virtual figure that participate in the battle game task and belong to different camps.

S2: Display a social invitation prompt pop-up window in the virtual scenario, where the social invitation prompt pop-up window carries a social invitation request transmitted by a first virtual figure.

S3: Control, in a case of determining that the third virtual figure accepts the social invitation request, the third virtual figure to enter a target virtual scenario in which the first virtual figure is located.

S4: Display an interaction picture of target virtual social resources in the target virtual scenario, where the target virtual social resources are virtual social resources transmitted by the third virtual figure and the first virtual figure to the second virtual figure.

A person of ordinary skill in the art may understand that, the structure shown in FIG. 14 is only schematic. The electronic device may alternatively be a terminal device such as a smartphone (such as an Android mobile phone or an iOS mobile phone), a tablet computer, a palmtop computer, a mobile Internet device (MID), or a PAD. FIG. 14 does not limit the structure of the electronic device. For example, the electronic device may further include more or fewer components (such as a network interface) than those shown in FIG. 14, or have a configuration different from that shown in FIG. 14.

The memory 1402 may be configured to store a software program and module, for example, a program instruction/module corresponding to the virtual resource interaction method and apparatus in the embodiments of this disclosure. The processor 1404 runs the software program and module stored in the memory 1402, to implement various functional applications and data processing, that is, implement the foregoing virtual resource interaction method. The memory 1402 may include a high-speed random memory, and may also include a non-volatile memory, for example, one or more magnetic storage apparatuses, a flash memory, or another non-volatile solid-state memory. In some embodiments, the memory 1402 may further include memories remotely disposed relative to the processor 1404, and the remote memories may be connected to a terminal through a network. Examples of the network include, but not limited to, the Internet, an intranet, a local area network, a mobile communication network, and a combination thereof. The memory 1402 may be specifically configured to, but not limited to, store information such as elements and virtual resource interaction information in a scenario picture. In an example, as shown in FIG. 14, the memory 1402 may include, but not limited to, a first display unit 1202, a second display unit 1204, a transmitting unit 1206, and a third display unit 1208 in the virtual resource interaction apparatus. In addition, the memory may further include, but not limited to, other modules and units in the virtual resource interaction apparatus. Details are not described herein again.

In an embodiment, the foregoing transmission apparatus 1406 is configured to receive or transmit data through a network. Specific examples of the foregoing network may include a wired network and a wireless network. In an example, the transmission apparatus 1406 includes a network interface controller (NIC). The NIC may be connected to another network device and a router by using a network cable, so as to communicate with the Internet or a local area network. In an example, the transmission device 1406 is a radio frequency (RF) module, which communicates with the Internet in a wireless manner.

In addition, the electronic device further includes a display 1408, configured to show a virtual scenario in an interface; and a connection bus 1410, configured to connect various module components in the electronic device.

In other embodiments, the terminal device or the server may be a node in a distributed system. The distributed system may be a blockchain system. The blockchain system may be a distributed system formed by a plurality of nodes connected in the form of network communication. A peer to peer (P2P) network may be formed between the nodes. A computing device in any form, for example, an electronic device such as a server or a terminal, may become a node in the blockchain system by joining the P2P network.

According to an aspect of this disclosure, a computer program product is provided. The computer program product includes a computer program/instructions, and the computer program/instructions include program code used for performing the methods shown in the foregoing flowcharts. In such an embodiment, by using a communication part, the computer program may be downloaded and installed from a network, and/or installed from a removable medium. When the computer program is executed by a central processing unit, various functions defined in the embodiments of this disclosure are executed.

The sequence numbers of the foregoing embodiments of this disclosure are merely for a description purpose, and do not indicate the preference among the embodiments.

According to an aspect of this disclosure, a non-transitory computer-readable storage medium is provided. A processor of a computer device reads computer instructions from the computer-readable storage medium, and the processor executes the computer instructions, so that the computer device performs the foregoing virtual resource interaction method.

In this embodiment, the computer-readable storage medium may be configured to store a computer program configured to perform the following steps:

S1: Display a virtual scenario provided by a battle game task, where the virtual scenario includes a first virtual figure and a second virtual figure that participate in the battle game task and belong to different camps.

S2: Display an invitation prompt pop-up window in response to a trigger operation performed on a trigger control corresponding to virtual social resources, where the invitation prompt pop-up window displays to-be-configured invitation configuration option information.

S3: Transmit, in a case that target invitation configuration information corresponding to the first virtual figure is determined based on the invitation configuration option information, a social invitation request to at least one virtual figure indicated in the target invitation configuration information.

S4: Display, in a case that a target virtual figure in the at least one virtual figure accepts the social invitation request, an interaction picture of target virtual social resources in the virtual scenario, where the target virtual social resources are virtual social resources transmitted by the first virtual figure and the target virtual figure to the second virtual figure based on the target invitation configuration information.

In this embodiment, the computer-readable storage medium may alternatively be configured to store a computer program configured to perform the following steps:

S1: Display a virtual scenario provided by a battle game task, where the virtual scenario includes a third virtual figure and a second virtual figure that participate in the battle game task and belong to different camps.

S2: Display a social invitation prompt pop-up window in the virtual scenario, where the social invitation prompt pop-up window carries a social invitation request transmitted by a first virtual figure.

S3: Control, in a case of determining that the third virtual figure accepts the social invitation request, the third virtual figure to enter a target virtual scenario in which the first virtual figure is located.

S4: Display an interaction picture of target virtual social resources in the target virtual scenario, where the target virtual social resources are virtual social resources transmitted by the third virtual figure and the first virtual figure to the second virtual figure, and the second virtual figure and the first virtual figure are virtual figures belonging to different camps in a round of battle game task.

In this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

When the integrated unit in the foregoing embodiments is implemented in a form of a software functional unit and sold or used as an independent product, the integrated unit may be stored in the foregoing computer-readable storage medium. Based on such an understanding, the technical solutions of this disclosure essentially, or a part contributing to the related art, or all or a part of the technical solutions may be implemented in a form of a software product. The computer software product is stored in a storage medium and includes several instructions for instructing one or more computer devices (which may be a personal computer, a server, or a network device) to perform all or some of the steps of the methods in the embodiments of this disclosure.

In the foregoing embodiments of this disclosure, descriptions of the embodiments have different emphases. As for parts that are not described in detail in one embodiment, reference may be made to the relevant descriptions of other embodiments.

In the several embodiments provided in this disclosure, it is to be understood that the disclosed client may be implemented in other manners. The described apparatus embodiment is merely exemplary. For example, the unit division is merely logical function division and there may be another division manner in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in the form of hardware, or may be implemented in the form of a software functional unit.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A virtual resource interaction method, comprising:
displaying, on a display of a first device associated with a first user account, a first virtual figure and a second virtual figure that participate in a battle game task in a virtual environment, the first virtual figure being controlled by the first device;
based on a user selection via a user interface of the first device, determining one or more selected virtual figures for performing a virtual action on the second virtual figure, a number of the one or more selected virtual figures being restricted based on a comparison of an amount of virtual resources possessed by the first virtual figure and an amount of virtual resources consumed by the virtual action performed by the one or more selected virtual figures and the first virtual figure together; and
based on one or more responses associated with the one or more selected virtual figures, displaying on the display of the first device:
the first virtual figure and a subset of the one or more selected virtual figures, and
a visual effect corresponding to the first virtual figure and the subset of the one or more selected virtual figures performing the virtual action on the second virtual figure together,
wherein the one or more selected virtual figures are not controlled by the first device.

2. The method according to claim 1, wherein the virtual action corresponds to showing a social expression to the second virtual figure.

3. The method according to claim 1, further comprising:
based on the user selection via the user interface of the first device, causing an invitation request to be transmitted to a target device configured to control one of the one or more selected virtual figures.

4. The method according to claim 3, further comprising:
receiving a confirmation message associated with the invitation request.

5. The method according to claim 4, wherein the confirmation message indicates:
the target device accepts the invitation request; or
the target device does not decline the invitation request.

6. The method according to claim 1, further comprising:
deducting the amount of virtual resources consumed by the virtual action from a first account associated with the first virtual figure for performance of the virtual action.

7. The method according to claim 1, further comprising:
in response to a determination of insufficient resources for performance of the virtual action, displaying a prompt on the display of the first device for supplementing virtual resources.

8. The method according to claim 1, further comprising:
displaying at least one candidate virtual figure on the user interface; and
selecting from the at least one candidate virtual figure the one or more selected virtual figures in response to a selection operation.

9. The method according to claim 1, further comprising:
displaying a configuration control for selecting the virtual action or an attribute of the virtual action.

10. The method according to claim 1, further comprising:
displaying the subset of the one or more selected virtual figures as being teleported into the virtual environment to perform the virtual action; and
displaying the subset of the one or more selected virtual figures as being teleported out from the virtual environment after the virtual action is completed.

11. A virtual resource interaction apparatus, comprising:
processing circuitry configured to:
display, on a display of the virtual resource interaction apparatus associated with a first user account, a first virtual figure and a second virtual figure that participate in a battle game task in a virtual environment, the first virtual figure being controlled by the virtual resource interaction apparatus;
based on a user selection via a user interface of the virtual resource interaction apparatus, determine one or more selected virtual figures for performing a virtual action on the second virtual figure, a number of the one or more selected virtual figures being restricted based on a comparison of an amount of virtual resources possessed by the first virtual figure and an amount of virtual resources consumed by the virtual action performed by the one or more selected virtual figures and the first virtual figure together; and
based on one or more responses associated with the one or more selected virtual figures, display on the display of the virtual resource interaction apparatus:
the first virtual figure and a subset of the one or more selected virtual figures, and
a visual effect corresponding to the first virtual figure and the subset of the one or more selected virtual figures performing the virtual action on the second virtual figure together,
wherein the one or more selected virtual figures are not controlled by the virtual resource interaction apparatus.

12. The apparatus according to claim 11, wherein the virtual action corresponds to showing a social expression to the second virtual figure.

13. The apparatus according to claim 11, wherein the processing circuitry is further configured to:

based on the user selection via the user interface of the virtual resource interaction apparatus, cause an invitation request to be transmitted to a target device configured to control one of the one or more selected virtual figures.

14. The apparatus according to claim 13, wherein the processing circuitry is further configured to:

receive a confirmation message associated with the invitation request.

15. The apparatus according to claim 14, wherein the confirmation message indicates:

the target device accepts the invitation request; or the target device does not decline the invitation request.

16. The apparatus according to claim 11, wherein the processing circuitry is further configured to:

deduct the amount of virtual resources consumed by the virtual action from a first account associated with the first virtual figure for performance of the virtual action.

17. The apparatus according to claim 11, wherein the processing circuitry is further configured to:

in response to a determination of insufficient resources for performance of the virtual action, display on the display of the virtual resource interaction apparatus a prompt for supplementing virtual resources.

18. The apparatus according to claim 11, wherein the processing circuitry is further configured to:

display at least one candidate virtual figure on the user interface; and select from the at least one candidate virtual figure the one or more selected virtual figures in response to a selection operation.

19. The apparatus according to claim 11, wherein the processing circuitry is further configured to:

display a configuration control for selecting the virtual action or an attribute of the virtual action.

20. A non-transitory computer-readable storage medium storing computer-readable instructions thereon, which, when executed by processing circuitry of a first device, cause the processing circuitry to perform a virtual resource interaction method:

displaying, on a display of the first device associated with a first user account, a first virtual figure and a second virtual figure that participate in a battle game task in a virtual environment, the first virtual figure being controlled by the first device;

based on a user selection via a user interface of the first device, determining one or more selected virtual figures for performing a virtual action on the second virtual figure, a number of the one or more selected virtual figures being restricted based on a comparison of an amount of virtual resources possessed by the first virtual figure and an amount of virtual resources consumed by the virtual action performed by the one or more selected virtual figures and the first virtual figure together; and based on one or more responses associated with the one or more selected virtual figures, displaying on the display of the first device:

the first virtual figure and a subset of the one or more selected virtual figures, and a visual effect corresponding to the first virtual figure and the subset of the one or more selected virtual figures performing the virtual action on the second virtual figure together, wherein the one or more selected virtual figures are not controlled by the first device.

* * * * *